US012710110B2

(12) United States Patent
Priisholm

(10) Patent No.: US 12,710,110 B2
(45) Date of Patent: Aug. 18, 2026

(54) VALVE CONTROL DEVICE

(71) Applicant: ALFA LAVAL CORPORATE AB, Lund (SE)

(72) Inventor: Thomas Priisholm, Kolding (DK)

(73) Assignee: ALFA LAVAL CORPORATE AB, Lund (SE)

(*) Notice: Subject to any disclaimer, the term of this patent is extended or adjusted under 35 U.S.C. 154(b) by 36 days.

(21) Appl. No.: 18/704,089

(22) PCT Filed: Nov. 8, 2022

(86) PCT No.: PCT/EP2022/081039
§ 371 (c)(1),
(2) Date: Apr. 24, 2024

(87) PCT Pub. No.: WO2023/079157
PCT Pub. Date: May 11, 2023

(65) Prior Publication Data

US 2024/0426394 A1 Dec. 26, 2024

(30) Foreign Application Priority Data

Nov. 8, 2021 (EP) .................................... 21206989

(51) Int. Cl.
*F16K 37/00* (2006.01)
*F16K 31/04* (2006.01)
(Continued)

(52) U.S. Cl.
CPC ........ *F16K 37/0041* (2013.01); *F16K 31/046* (2013.01); *F16K 31/1221* (2013.01);
(Continued)

(58) Field of Classification Search
CPC ............. F16K 37/0041; F16K 37/0033; F16K 31/1245; F16K 31/423; F16K 31/426;
(Continued)

(56) References Cited

U.S. PATENT DOCUMENTS 4,369,401 A 1/1983 Fayfield et al.
6,279,870 B1 * 8/2001 Welz, Jr. ............... F16K 27/029 431/18

(Continued)

FOREIGN PATENT DOCUMENTS

DE 102014113282 A1 3/2016
JP 2514233 Y2 * 10/1996

(Continued)

OTHER PUBLICATIONS

International Search Report (PCT/ISA/210) and Written Opinion (PCT/ISA/237) mailed on Feb. 7, 2023 by the European Patent Office as the International Searching Authority for International Application No. PCT/EP2022/081039. (13 pages).

(Continued)

*Primary Examiner* — Atif H Chaudry
(74) *Attorney, Agent, or Firm* — BUCHANAN INGERSOLL & ROONEY PC

(57) ABSTRACT

A valve control device for controlling operation of a valve actuator configured to be connected to a valve member. The valve control device being configured to be removably mounted on the valve actuator and comprises: a position sensor for detecting actuating position of the valve actuator and outputting the detected position as a feedback signal; a memory device for storing position data reflecting the feed-back signal from the position sensor at at least one actuating position of the valve actuator; and an electronic control unit for controlling operation of the valve actuator using the feedback signal from the position sensor and the position data from the memory device; wherein the electronic control unit is configured for automatically performing a reset of the position data of the memory device as a result of the valve control device becoming separated from, and/or assembled on, the valve actuator.

17 Claims, 11 Drawing Sheets

(51) Int. Cl.
*F16K 31/122* (2006.01)
*F16K 31/124* (2006.01)
*F16K 31/42* (2006.01)

(52) U.S. Cl.
CPC ........ *F16K 31/1245* (2013.01); *F16K 31/423* (2013.01); *F16K 31/426* (2013.01); *F16K 37/0033* (2013.01); *F15B 2211/6656* (2013.01)

(58) Field of Classification Search
CPC .... F16K 31/42; F16K 31/046; F16K 31/1221; F15B 2211/6656
See application file for complete search history.

(56) References Cited

U.S. PATENT DOCUMENTS

| | | | |
|---|---|---|---|
| 10,378,672 | B2 | 8/2019 | Beck et al. |
| 10,502,340 | B2 | 12/2019 | Karg et al. |
| 2018/0245712 | A1 | 8/2018 | Priisholm et al. |
| 2020/0063890 | A1 | 2/2020 | Senkyr et al. |
| 2021/0055136 | A1 | 2/2021 | Sapija et al. |

FOREIGN PATENT DOCUMENTS

| | | | | |
|---|---|---|---|---|
| WO | 2017001178 | A1 | 1/2017 | |
| WO | WO-2019215042 | A1 * | 11/2019 | ............ F15B 19/002 |

OTHER PUBLICATIONS

ThinkTop V50 and V70 Instruction Manual, Lit. Code 200000549-5-EN-GB, Manual No. 100000340, published by Alfa Laval Kolding A/S, Kolding, Denmark, Oct. 2020, pp. 1-32. (32 pages).

* cited by examiner 7
6
34
1
24
25
33
12
4
14
15
18
13
16

32
31
29
9
2
17
20
23
30
19
21
28
22
10
39
40

35
36
11
38
3
37

FB [V]
5.0
4.0
3.0
2.0
1.0
L2
L1
d [mm]
PR1
P1
PR2
P2
PR3

FB [V]
L2
L1
t [s]
T1

FB [V]
L2
L1
t [s]
T1

FB [V]
L2
L4
L3
L1
t [s]
T2
T1

33
7
6
34
1
24
25
26
12
4
8
41
15
14
32
13
18
16
31
29
9
17
2
20
23
30
19
21
27
28
22
10
39
40
35
S1
S2
S3
S4
11
36
38
3
37

FB [V]
42
43
t [s]

FB [V]
42
43
t [s]

S10
S20
S30
S40
S50

S10
S20
S30
S40
S45
S50*

S100
S200

S100
S150
S200*

VALVE CONTROL DEVICE

TECHNICAL FIELD

The present disclosure relates to valve control device for controlling operation of a valve actuator configured to be connected to a valve member. The disclosure further relates to a method for operating a valve control device, which is configured to be removably mounted on a valve actuator.

BACKGROUND

In the field of valve control devices for controlling operation of a valve actuator connected to a certain valve, there is sometimes a need for replacing the currently used valve actuator and/or valve to a new valve actuator and/or valve of another type, size and/or configuration, or to a new version of the same type. There may also sometimes be a need for disassembly of the currently used valve actuator and/or valve for maintenance or repair work. In connection with replacement and/or maintenance work of the valve actuator and/or valve, the previously stored operating settings of the valve control device may become invalid, for example due to a new or altered operating range of the new valve actuator and/or valve. Hence, there is not seldom a need for reset and recalibration of the valve control device in connection with replacement and/or maintenance work of the valve actuator and/or valve.

Such reset and recalibration of the valve control device is conventionally performed by activating such a reset and recalibration process at an appropriate time point, such as for example after finished assembly of the valve control device with a new or modified valve actuator and/or valve. Activating of such a reset and recalibration process is for example performed by user input via a user interface of the valve control device. For example, a user may touch or depress an actuation button of a user interface, or input instructions via a display, or the like.

However, there is a continuous demand for simplifying handling and reducing cost of the valve control device. There is thus a need for an improved valve control device.

SUMMARY

An object of the present disclosure is to provide a valve control device and method for operating a valve control device, where the previously mentioned problems are avoided. This object is at least partly achieved by the features of the independent claims.

According to a first aspect of the present disclosure, there is provided a valve control device for controlling operation of a valve actuator configured to be connected to a valve member. The valve control device being configured to be removably mounted on the valve actuator and comprising: a position sensor for detecting actuating position of the valve actuator and outputting the detected position as a feedback signal; a memory device for storing position data reflecting the feedback signal from the position sensor at at least one actuating position of the valve actuator; and an electronic control unit for controlling operation of the valve actuator using the feedback signal from the position sensor and the position data from the memory device; wherein the electronic control unit is configured for automatically performing a reset of the position data of the memory device as a result of the valve control device becoming separated from, and/or assembled on, the valve actuator.

According to a second aspect of the present disclosure, there is provided a method for operating a valve control device, which is configured to be removably mounted on a valve actuator. The method comprising: detecting an actuating position of the valve actuator by means of a position sensor of the valve control device and outputting the detected position as a feedback signal; obtaining the feedback signal from the position sensor by an electronic control unit; controlling operation of the valve actuator by means of the electronic control unit using the received feedback signal from the position sensor and position data obtained from a memory device of the valve control device, wherein the memory device stores position data reflecting the feedback signal from the position sensor at at least one actuating position of the valve actuator; detecting separation and/or assembly of the valve control device relative to the valve actuator; and automatically performing a reset of the position data of the memory device of the valve control device based on a determination that the valve control device has been separated and/or assembled relative to the valve actuator.

According to a third aspect of the present disclosure, there is provided a method for performing a reset of position data of a memory device of a valve control device, which is configured to be removably mounted on a valve actuator. The valve control device comprising: a position sensor for detecting actuating position of the valve actuator and outputting the detected position as a feedback signal; a memory device for storing position data reflecting the feedback signal from the position sensor at at least one actuating position of the valve actuator; and an electronic control unit for controlling operation of the valve actuator using the feedback signal from the position sensor and the position data from the memory device. The method comprising: detecting separation and/or assembly of the valve control device relative to the valve actuator; and automatically performing a reset of the position data of the memory device of the valve control device based on a determination that the valve control device has been separated and/or assembled relative to the valve actuator.

In this way, activating of a reset process of the valve control device is simplified and the user neither needs to remember to perform the reset process, nor knowledge of how to handle the user interface for activating the reset process. Furthermore, the valve control device does not need a user interface enabling a use to manually activating the reset process, thereby saving cost for design and manufacturing of the valve control device. Consequently, the valve control device, the method for operating a valve control device and the method for performing a reset of position data of a memory device of a valve control device defined above results in simplified handling and reducing cost of the valve control device.

Further advantages are achieved by implementing one or several of the features of the dependent claims.

For example, in some example embodiments, the electronic control unit is configured for automatically detecting separation and/or assembly of the valve control device relative to the valve actuator, and performing a reset of the position data of the memory device in response to such an automatic detection of separation and/or assembly of the valve control device relative to the valve actuator. Thereby, valve control device provides simplified handling and reduced cost due to lack of need for user interface.

The valve control device of the first aspect may thereby be worded as a valve control device for controlling operation of a valve actuator configured to be connected to a valve member. The valve control device being configured to be removably mounted on the valve actuator and comprising: a position sensor for detecting actuating position of the valve actuator and outputting the detected position as a feedback signal; a memory device for storing position data reflecting the feedback signal from the position sensor at at least one actuating position of the valve actuator; and an electronic control unit for controlling operation of the valve actuator using the feedback signal from the position sensor and the position data from the memory device; wherein the electronic control unit is configured for automatically detecting separation and/or assembly of the valve control device relative to the valve actuator, and automatically performing a reset of the position data of the memory device in response to such an automatic detection of separation and/or assembly of the valve control device relative to the valve actuator.

The valve control device of the first aspect may thereby further be worded as a valve control device for controlling operation of a valve actuator configured to be connected to a valve member. The valve control device being configured to be removably mounted on the valve actuator and comprising: a position sensor for detecting actuating position of the valve actuator and outputting the detected position as a feedback signal; a memory device for storing position data reflecting the feedback signal from the position sensor at at least one actuating position of the valve actuator; and an electronic control unit for controlling operation of the valve actuator using the feedback signal from the position sensor and the position data from the memory device; wherein the electronic control unit is configured for automatically performing a reset of the position data of the memory device as a result of the valve control device becoming separated from, and/or assembled on, the valve actuator, wherein the electronic control unit is configured for automatically performing the reset by the electronic control unit being configured for automatically detecting separation and/or assembly of the valve control device relative to the valve actuator, and automatically performing the reset of the position data of the memory device in response to such an automatic detection of separation and/or assembly of the valve control device relative to the valve actuator.

In some example embodiments, that may be combined with any one or more of the above-described embodiments, the electronic control unit is configured for automatic detection of said separation and/or assembly of the valve control device relative to the valve actuator based on the feedback signal of the position sensor. The feedback signal is nevertheless provided for enabling the valve control device to monitor the operation of the valve actuator. Hence, using the feedback signal also for detecting separation and/or assembly of valve control device enables simplified and cost-efficient design.

In some example embodiments, that may be combined with any one or more of the above-described embodiments, the electronic control unit is configured to determine separation and/or assembly of valve control device relative to the valve actuator when the feedback signal of the position sensor is indicative of lack of sensed object or out of operating range. This is an innovating way of using the feedback signal for detecting removal/assembly. In other words, the electronic control unit may be configured to determine separation and/or assembly of valve control device relative to the valve actuator based on the feedback signal of the position sensor being indicative of lack of sensed object or out of operating range.

In some example embodiments, that may be combined with any one or more of the above-described embodiments, the electronic control unit further comprises an electrical connector configured for being connected to an external power supply connector, and the electronic control unit is configured for automatically performing a reset of the position data of the memory device as a result of the combined actions of: the valve control device being separated from, and/or assembled on, the valve actuator; and the electrical connector being unplugged from the external power supply connector and/or plugged into the external power supply connector while the valve control device is being in a separated state relative to the valve actuator. Thereby, the risk for undesired resets may be reduced.

In some example embodiments, that may be combined with any one or more of the above-described embodiments, the electronic control unit further comprises an electrical connector configured for being connected to an external power supply connector, and the electronic control unit is configured for: automatically detecting separation and/or assembly of the valve control device relative to the valve actuator; automatically detecting unplugging or plugging in of the electrical connector relative to the power supply connector; and performing a reset of the position data of the memory device in response to the combined actions of automatic detection of separation and/or assembly of the valve control device and automatic detection of unplugging or plugging in of the electrical connector. Thereby, the risk for undesired resets may be reduced.

In some example embodiments, that may be combined with any one or more of the above-described embodiments, the electronic control unit is configured for automatic detection of such separation and/or assembly of valve control device based on the feedback signal of the position sensor, and wherein the electronic control unit is configured for automatic detection of unplugging or plugging in of the electrical connector relative to the power supply connector based on measured supply voltage and/or current level. This enables a cost-efficient design and implementation of the valve control device.

In some example embodiments, that may be combined with any one or more of the above-described embodiments, the electronic control unit further comprises an electrical connector configured for being connected to an external power supply connector, and the electronic control unit is configured for automatically performing a reset of the position data of the memory device when: the valve control device first has been separated from the valve actuator, the power supply connector for powering the valve control device subsequently has been unplugged from the valve control device while the valve control device still is in a separated condition, and the power supply connector for powering the valve control device thereafter has been plugged into the valve control device again; or when the power supply connector for powering the valve control device first has been unplugged from the valve control device, the valve control device subsequently becomes separated from the valve actuator, and the power supply connector for powering the valve control device thereafter has been plugged into the valve control device again while the valve control device still is in a separated condition. Thereby, the risk for undesired resets may be reduced.

In some example embodiments, that may be combined with any one or more of the above-described embodiments, the valve control device is free from a HMI interface that enables a user to activate a reset of the position data of the memory device. Thereby, a more cost-efficient design is accomplished.

In some example embodiments, that may be combined with any one or more of the above-described embodiments, the electronic control unit is assembled on a printed circuit board, which also carries the memory device and the position sensor. Thereby, a more cost-efficient and compact design is accomplished.

In some example embodiments, that may be combined with any one or more of the above-described embodiments, the valve control device further comprises an electrical connector configured for being connected to a power supply connector, and an output port configured for being connected, and supplying power to the valve actuator. Thereby, control of the valve actuator is accomplished.

In some example embodiments, that may be combined with any one or more of the above-described embodiments, the valve control device further comprises fasteners configured for removably attaching the valve control device to the valve actuator. This enables a fast and flexible attachment and detachment of the valve control device.

In some example embodiments, that may be combined with any one or more of the above-described embodiments, wherein the electronic control unit is configured for, subsequent or in connection with an automatic reset of the position data of the memory device of the valve control device and assembly of the valve control device on the valve actuator, performing an automatic setup of the valve control device, wherein the automatic setup involves storing, in the memory device, position data reflecting the feedback signal from the position sensor at at least one actuating position of the valve actuator. A reset of the position data of the memory device generally requires a subsequent setup of the valve control device for proper functioning.

In some example embodiments, that may be combined with any one or more of the above-described embodiments, the automatic setup of the valve control device involves controlling operation of the valve control device to move the valve actuator to its end limit positions, reading the feedback signal of the position sensor at these end limit positions and storing, in the memory device, position data in the memory device reflecting the feedback signal at said end limit positions. Thereby, a cost-efficient and non-complex control and/or monitoring functionality can be implemented.

The disclosure also relates to an assembly comprising the valve control device as described above, and the valve actuator, wherein the valve actuator comprises a linearly moveable actuating stem arranged in a stationary actuator housing, and wherein the position sensor is configured for detecting the position of the moveable actuating stem. Thereby, a cost-efficient and reliable detection of the actuating position of the valve member is accomplished.

In some example embodiments, that may be combined with any one or more of the above-described embodiments, a sensed object is attached to or forms part of the moveable actuating stem, and wherein the position sensor is configured for detecting the position of the sensed object. Thereby, a cost-efficient and reliable detection of the actuating position of the valve member is accomplished.

In some example embodiments, that may be combined with any one or more of the above-described embodiments, the valve control device has a recess in a side wall configured for facing the valve actuator, wherein the sensed object of the actuating stem protrudes from the actuator housing and is inserted into the recess, wherein the position sensor is located adjacent an interior wall of the recess for enabling detection of the actuating position of the sensed object. Thereby, a cost-efficient and reliable detection of the actuating position of the valve member is accomplished.

In some example embodiments, that may be combined with any one or more of the above-described embodiments, the valve actuator includes a spring-loaded linearly moveable piston that is operated pneumatically and connected to the actuating stem. This provides a cost-efficient and reliable design of the valve actuator.

In some example embodiments, that may be combined with any one or more of the above-described embodiments, the assembly further comprises a valve housing including the valve member, wherein the valve member is connected to the linearly moveable actuating stem of the valve actuator. Thereby, reliable and cost-efficient control and monitoring of the actuating position of the valve member is accomplished.

The method for operating a valve control device of the second aspect may be worded as a method for operating a valve control device, which is configured to be removably mounted on a valve actuator. The method comprising: detecting an actuating position of the valve actuator by means of a position sensor of the valve control device and outputting the detected position as a feedback signal; obtaining the feedback signal from the position sensor by an electronic control unit; controlling operation of the valve actuator by means of the electronic control unit using the received feedback signal from the position sensor and position data obtained from a memory device of the valve control device, wherein the memory device stores position data reflecting the feedback signal from the position sensor at at least one actuating position of the valve actuator; detecting separation and/or assembly of the valve control device relative to the valve actuator; and automatically performing a reset of the position data of the memory device of the valve control device based on (or in response to) the detection of separation and/or assembly of the valve control device relative to the valve actuator.

The method for performing a reset of position data of the third aspect may be worded as a method for performing a reset of position data of a memory device of a valve control device, which is configured to be removably mounted on a valve actuator. The valve control device comprising: a position sensor for detecting actuating position of the valve actuator and outputting the detected position as a feedback signal; a memory device for storing position data reflecting the feedback signal from the position sensor at at least one actuating position of the valve actuator; and an electronic control unit for controlling operation of the valve actuator using the feedback signal from the position sensor and the position data from the memory device. The method comprising: detecting separation and/or assembly of the valve control device relative to the valve actuator; and automatically performing a reset of the position data of the memory device of the valve control device based on (or in response to) the detection of separation and/or assembly of the valve control device relative to the valve actuator.

The step detecting separation and/or assembly of the valve control device relative to the valve actuator may be worded as automatically detecting separation and/or assembly of the valve control device relative to the valve actuator.

In some example embodiments, that may be combined with any one or more of the above-described embodiments, the step of detecting separation and/or assembly of the valve control device relative to the valve actuator involves comparing the feedback signal of the position sensor with at least one predetermined value or signal indicative of separation and/or assembly of the valve control device relative to the valve actuator. Thereby, a cost-efficient and non-complex monitoring functionality is provided.

In some example embodiments, that may be combined with any one or more of the above-described embodiments, the method further comprises: detecting unplugging and/or plugging in of an external power supply connector in an electrical connector of the valve control device, and detecting whether the valve control device is being in a separated state relative to the valve actuator during said unplugging or plugging in event; and automatically performing a reset of the position data of the memory device of the valve control device based on the combined determination that: the valve control device has been separated and/or assembled relative to the valve actuator, and the power supply connector for powering the valve control device has been unplugged from the valve control device and/or plugged into the valve control device while the valve control device was in a separated state relative to the valve actuator.

In some example embodiments, that may be combined with any one or more of the above-described embodiments, the method further comprises, subsequent or in connection with the step of automatically performing a reset of the position data of the memory device of the valve control device and assembly of the valve control device on the valve actuator, performing an automatic setup of the valve control device, wherein the automatic setup involves storing, in the memory device, position data reflecting the feedback signal from the position sensor at at least one actuating position of the valve actuator.

Further features and advantages of the invention will become apparent when studying the appended claims and the following description. The skilled person in the art realizes that different features of the present disclosure may be combined to create embodiments other than those explicitly described hereinabove and below, without departing from the scope of the present disclosure.

BRIEF DESCRIPTION OF DRAWINGS

The valve control device, assembly and methods according to the disclosure will be described in detail in the following, with reference to the attached drawings, in which.

DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1A:
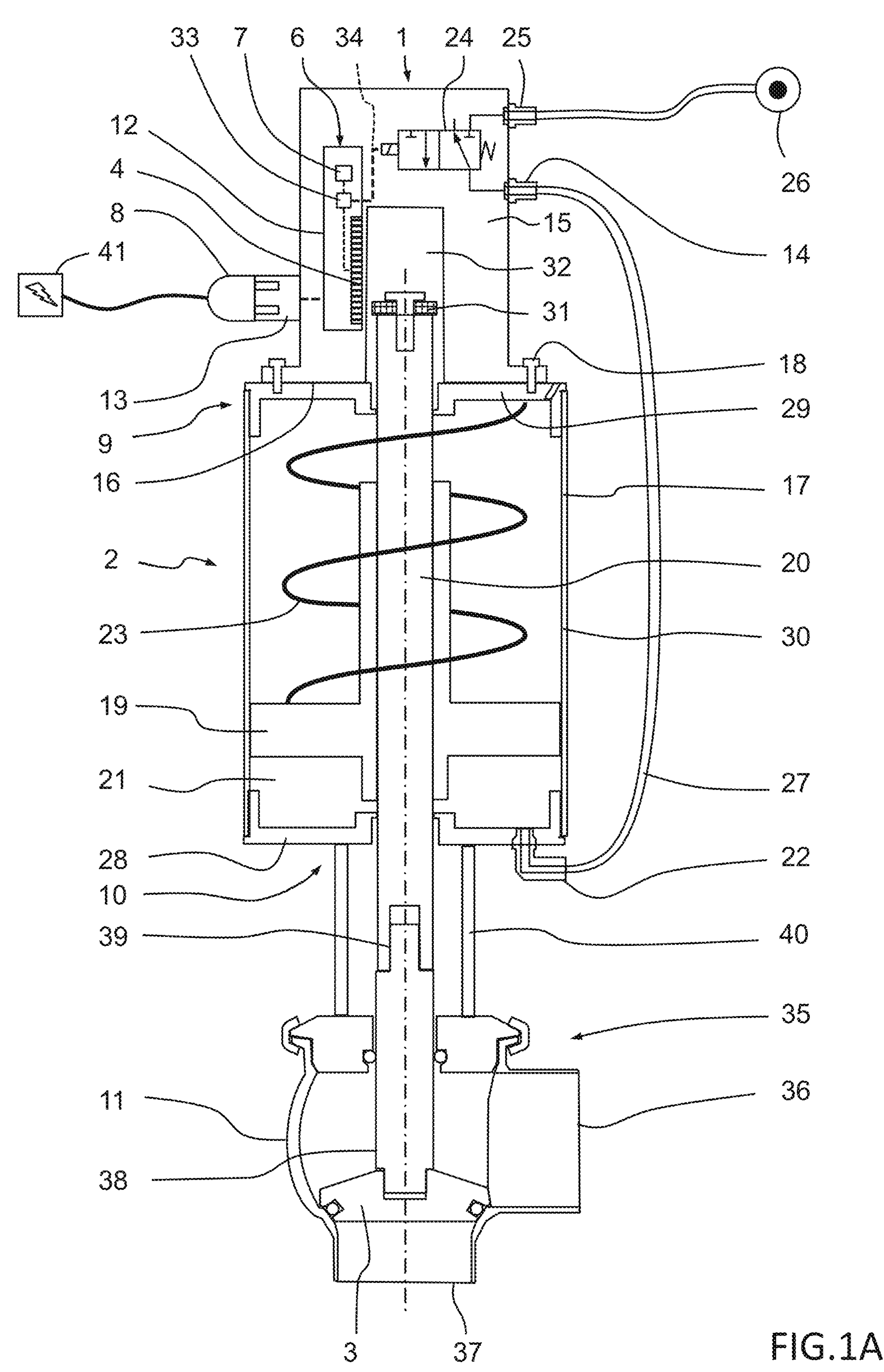
FIG. 1A-B shows schematically a side-view of an example embodiment of the assembly according to the disclosure, in closed and open state, respectively.

FIG. 1A schematically shows an example embodiment of a valve control device 1 for controlling operation of a valve actuator 2 configured to be connected to a valve member 3 of a flow control valve 35. In other words, the valve member 3 may be moved from a closed position to an open position, and back again, and possibly to one or more intermediate positions located somewhere between the closed and opened positions, by means of the valve actuator 2, which is controlled by the valve control device 1.

Figure 1B:
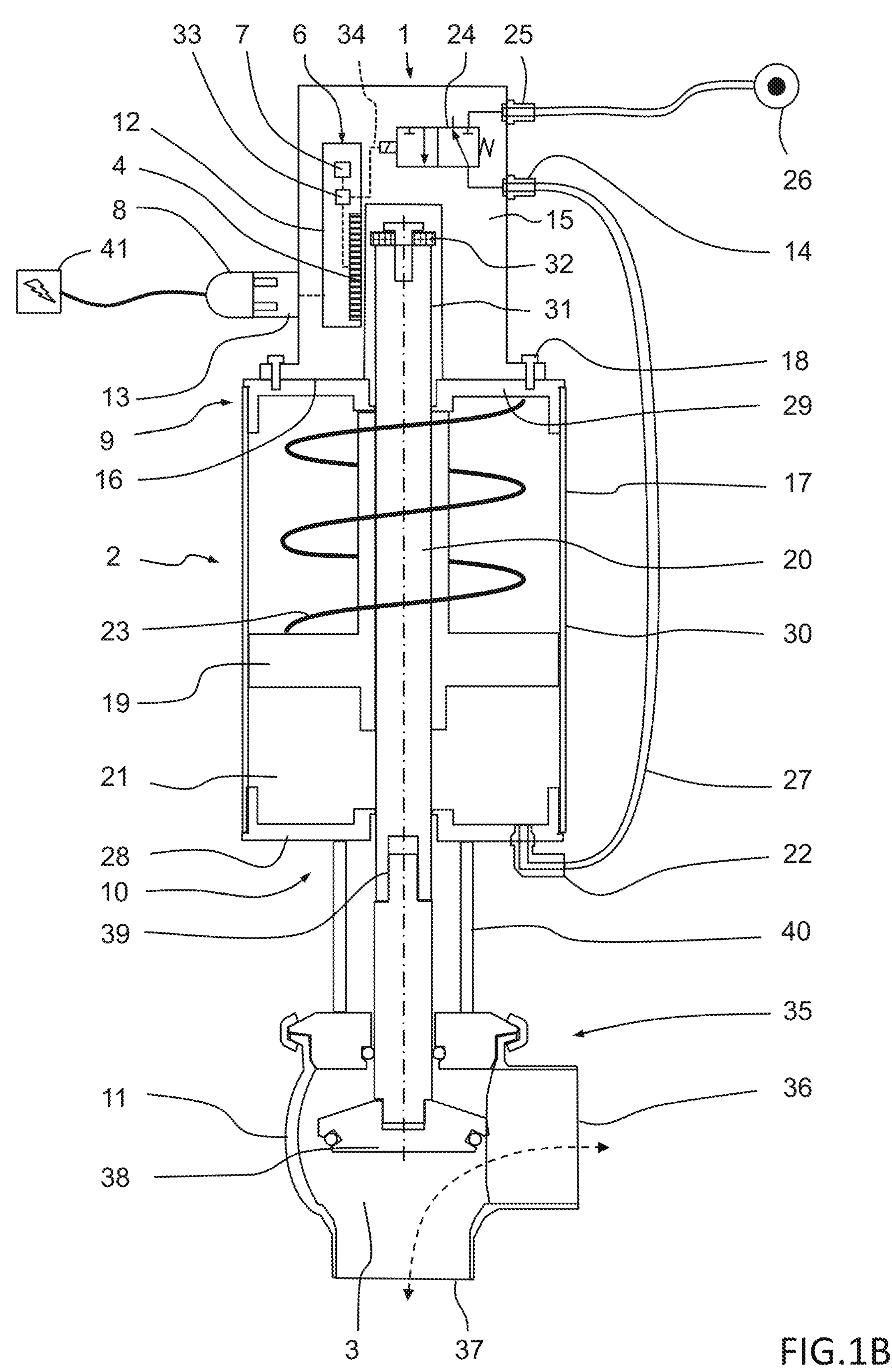

FIG. 1A shows the flow control valve 35 with the valve member 3, the valve actuator 2 and the valve control device 1 in assembled state and with the valve member in closed position, and FIG. 1B shows the same assembly but with the valve member in an open position.

Figures 2A, 2B, 2C:
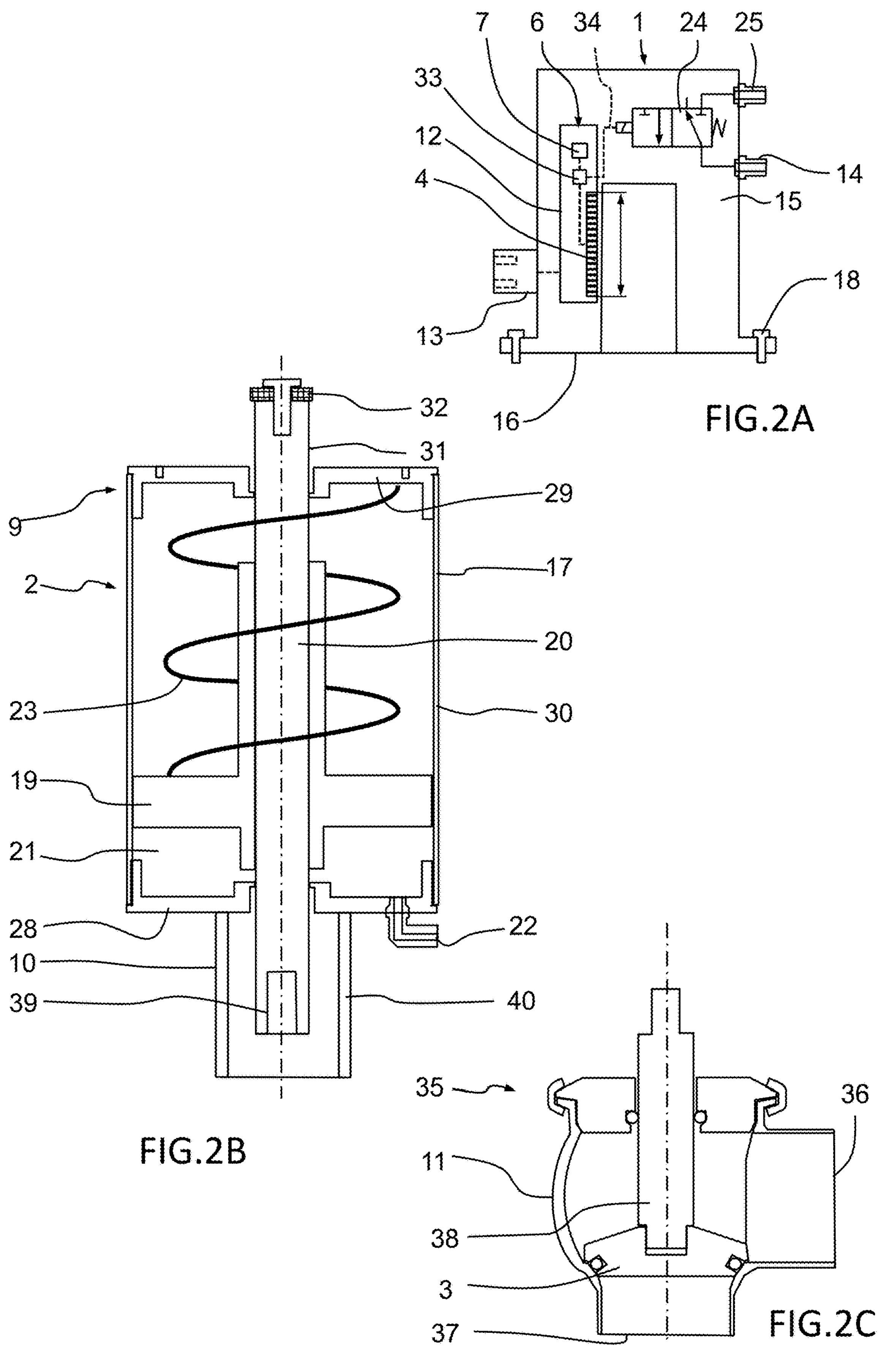
FIG. 2A shows an example embodiment of the valve control device.
FIG. 2B shows an example embodiment of the valve actuator
FIG. 2C shows an example embodiment of the flow control valve.

Furthermore, FIGS. 2A-2C shows this assembly in a disassembled state. FIG. 2A thus shows the valve control device 1 in a detached state, i.e. separated from the valve actuator 2. FIG. 2B shows the valve actuator 2, as such, having a first axial side 9 for attachment to the valve control device 1, and a second axial side 10 for attachment to the valve member 3. Finally, FIG. 2C shows the flow control valve with the valve member 3 movably located in a valve housing 11.

With reference to FIGS. 1A-B and 2A, the valve control device 1 is configured to be removably mounted on the valve actuator 2 and comprises a position sensor 4 for detecting actuating position of the valve actuator 2 and outputting the detected position as a feedback signal. Clearly, the position sensor 4 can only detecting actuating position of the valve actuator 2 when the valve control device 1 is properly mounted on the valve actuator 2.

The valve control device 1 further comprises a data memory device 7 for storing position data reflecting the feedback signal from the position sensor 4 at at least one actuating position of the valve actuator 2. For example, the position data stored in the data memory device may be end limit positions of a current operating range of the valve actuator 2, and/or actuating positions reflecting valve member 3 in open and/or closed position, and possibly including one or more intermediate opening positions of the valve member 3.

In addition, the valve control device 1 comprises an electronic control unit (ECU) 6 for controlling operation of the valve actuator 2 using the feedback signal from the position sensor 4 and the position data from the memory device 7.

The electronic control unit 6 may for example be configured to control operation of the valve actuator primarily based on instructions from a remote electronic controller, such as a more or less central or master controller. However, the electronic control unit 6 may then include some type of monitoring operation for verifying correct operation of the valve actuator 2, i.e. that the valve actuator 2 correctly follows the instructions provided by the remote controller.

In some example embodiments, the electronic control unit 6 may be configured for triggering an alarm when the valve actuator 2 does not reach the target actuating position for some reason, based on the feedback signal from the position sensor 4.

In other example embodiments, the electronic control unit 6 may be configured for using the feedback signal for regulating and controlling the actuating position of the valve actuator 2 using a feedback position controller.

Furthermore, the electronic control unit 6 is configured for automatically performing a reset of the position data of the memory device 7 as a result of the valve control device 1 becoming separated from, and/or assembled on, the valve actuator 2.

The position data of the memory device is generally used by the ECU 6 for controlling operation of the valve actuator and/or monitoring proper actuation of the valve actuator 2. For example, the position data may define upper and lower boundaries of the output signal from the position sensor 4 during normal operation for enabling the ECU to detect un-normal operation, and to activate an alarm of the like in response thereto. However, the valve control device may be assembled with a many different types of valves, all resulting in an individual and unique upper and lower operating boundaries for normal operation. Hence, in cases where the currently used valve actuator and/or valve are replaced for a new valve actuator and/or valve, or when the currently used valve actuator and/or undergo maintenance or repair work, there may be a need for resetting the previously stored operating settings of the valve control device, for example due to a new or altered operating range of the new valve actuator and/or valve.

A reset of the position data of the memory device 7, also referred to as reset of the memory device 7, may for example involve deleting at least one stored data value, or overwriting a stored data value, or marking a stored data value as being invalid or the like, for example using a data quality flag or the like. In other words, the electronic control unit 6 can easily detect when the memory device 7 has stored position data that is valid for use, and oppositely.

The electronic control unit 6 may for example be assembled on a printed circuit board 12, which carries an electronic processor 33, the memory device 7 and the position sensor 4. For enabling cost-efficient manufacturing and compact design. However, the position sensor 4 may alternatively be a separate component not mounted on the same PCB as the electronic control unit 6 and/or memory device 4.

The components of the valve control device 1 may be assembled in a control housing 15 of the valve control device 1. The control housing 15 may have a connection interface 16 for removable attachment of the control housing 15 to an actuator housing 17 of the valve actuator 2. According to one example embodiment, the control housing may be removably connected to the actuator housing 17 by means of fasteners 18, such as threaded fasteners.

The valve control device 1 further comprises an electrical connector 13 configured for being connected to an electrical power supply connector 8, and an output port 14 configured for being connected and supplying power to the valve actuator 2.

The electrical power supply connector 8 may for example be connected to a power grid 41.

The output port 14 may for example supply pneumatic power or electric power to the valve actuator 2 for controlling the motion of the valve actuator 2.

In the example embodiment of FIGS. 1A-B and 2A-C, the valve actuator 2 is a single-acting pneumatic cylinder having a front end cap 28 facing the valve housing 11, a rear end cap 29 facing the valve control device 1, a cylinder barrel 30, a piston 19 moveable in the barrel 30 between the front and rear end caps 28, 29 and connected to a linearly moveable actuating stem 20, a mechanical spring 23 for biasing the piston 19 towards a natural operating state, an air pressure chamber 21 partly defined by the piston 19, a pressure port 22 defining an air passage to the air pressure chamber 21.

Specifically, in some example embodiments, the valve control device 1 may include a pneumatic control valve 24 controlled by the ECU 6, for example by means of a solenoid of the pneumatic control valve 24 and an electrical connector line 34 connecting the ECU 8 with the pneumatic control valve 2. The valve control device 1 may include an air supply port 25 for supply of pressurised air from a source 26 of pressurised air. Consequently, the ECU 6 may control operation of the pneumatic control valve 24 and thereby controlling supply of the pressurised air from the source 26 to the air pressure chamber 21, thereby controlling operation of the valve actuator 2.

Consequently, in the example embodiment of FIGS. 1A-B and 2A-C, by means of an air pipe 27 connecting the outlet port 14 of the valve control device 1 and the pressure port 22 of the valve actuator 2, the valve control device 1 may control supply of pneumatic power in form of pressurized air to the air pressure chamber 21 for controlling the actuating position of the actuating stem 20, against the spring force of the mechanical spring 23.

The electrical connector 13, the output port 14 and/or the air supply port 25 of the valve control device 1 may for example be fixed to and integrated in the housing 15 of the valve control device 1.

In assembled state, i.e. in a state where the valve control device 1 and the valve actuator 2 are mutually connected, the linearly moveable actuating stem 20 is arranged primarily in a stationary actuator housing 17, and the position sensor 4 is configured for detecting the actuating position of the moveable actuating stem 20.

According to some example embodiments, this may be accomplished by providing a sensed object attached to, or forming part of, the moveable actuating stem, and wherein the position sensor 4 is configured for detecting the position of the sensed object 31.

The sensed object 31 may for example be a magnetic object and the position sensor 4 may an array of magnetoresistive sensor. However, various of other types of position sensors may be used, such as in particular linear position sensors or proximity sensors based on various types of sensing technology, such as Hall-effect, inductance, capacitance, optical, linear potentiometer, linear magnetic Hall Effect sensor, incremental linear encoder, linear inductive position sensor, etc.

Furthermore, according to some example embodiments, the position sensor 4 may be an inductive proximity sensor arrangement or the like configured to use the metallic actuating stem 20 itself as the sensed object 31.

In the example embodiment of FIGS. 1A-B, the valve control device 1 has a recess 32 or hole in a wall of the control housing 15 configured for facing the valve actuator 2, i.e. the wall of the connection interface 16 of the control housing 15. Moreover, in assembled state of the valve control device 1 and valve actuator 2, the sensed object/part 31 of the actuating stem 20 protrudes from the actuator housing, or at least through the rear end cap 29, and is inserted into the recess 32, and the position sensor 4 is located adjacent an interior wall of the recess 32 for enabling detection of the actuating position of the sensed object 31, and thus also the actuating position of the actuating stem 20.

In an alternative embodiment, the recess could be provided in the actuator housing 17 instead, and the position sensor 4 may protrudes from the control housing and be inserted into the recess 32, such that the position sensor 4 becomes located adjacent the sensed object 31 for enabling detection of the actuating position of the actuating stem 20.

The assembly of FIG. 1A-B further comprises the flow control valve 35 having the valve housing 11 including the valve member 3, wherein the valve member 3 is connected to the linearly moveable actuating stem 20 of the valve actuator 2. In other words, axial motion of the piston 19 of the valve actuator 2 is directly transferable to actuation motion of the valve member 3.

The valve member 3 may be connected to the actuating stem 20 via an intermediate stem part 38 that is connected to the actuating stem 20 via a detachable stem joint 39, such as a threaded joint, thereby enabling simplified removal/attachment of the valve housing 11 and associated valve member 3 from/to the valve actuator 2. Furthermore, in some example embodiments, a spacer 40 may be arranged between the barrel 30 of the valve actuator 2 and valve housing 11.

The flow control valve 35 may for example be part of single seat valve, as depicted in FIGS. 1A-B and 2C, wherein the valve housing 11 is stationary and the valve member 3 moved between a closed position and open position by means of the valve actuator 2. In the closed position, the valve member 3 abuts a valve seat of the valve housing for closing a flow path.

The valve housing 11 may have a first flow port 36 and a second flow port 37, wherein a flow path between the first and second flow ports is open when the valve member 3 is set in the open position, and wherein the flow path between the first and second flow ports is closed when the valve member 3 is set in the closed position.

As described above, the electronic control unit 6 is configured for automatically performing a reset of the position data of the memory device 7 as a result of the valve control device 1 becoming separated from, and/or assembled on, the valve actuator 2, for enabling simplified handling and reduced cost of the valve control device 1. The automatic reset may be accomplished in various ways.

According to some example embodiments, the electronic control unit 6 is configured for automatically detecting separation and/or assembly of the valve control device 1 relative to the valve actuator 2, and performing a reset of the position data of the memory device 7 in response to such an automatic detection of separation and/or assembly of the valve control device 1 relative to the valve actuator 2.

In other words, the electronic control unit 6 is configured for automatically detecting separation of the valve control device 1 from the valve actuator 2 and/or assembly of the valve control device on the valve actuator 2, and performing a reset of the position data of the memory device 7 in response to such a detected event.

Figure 3:
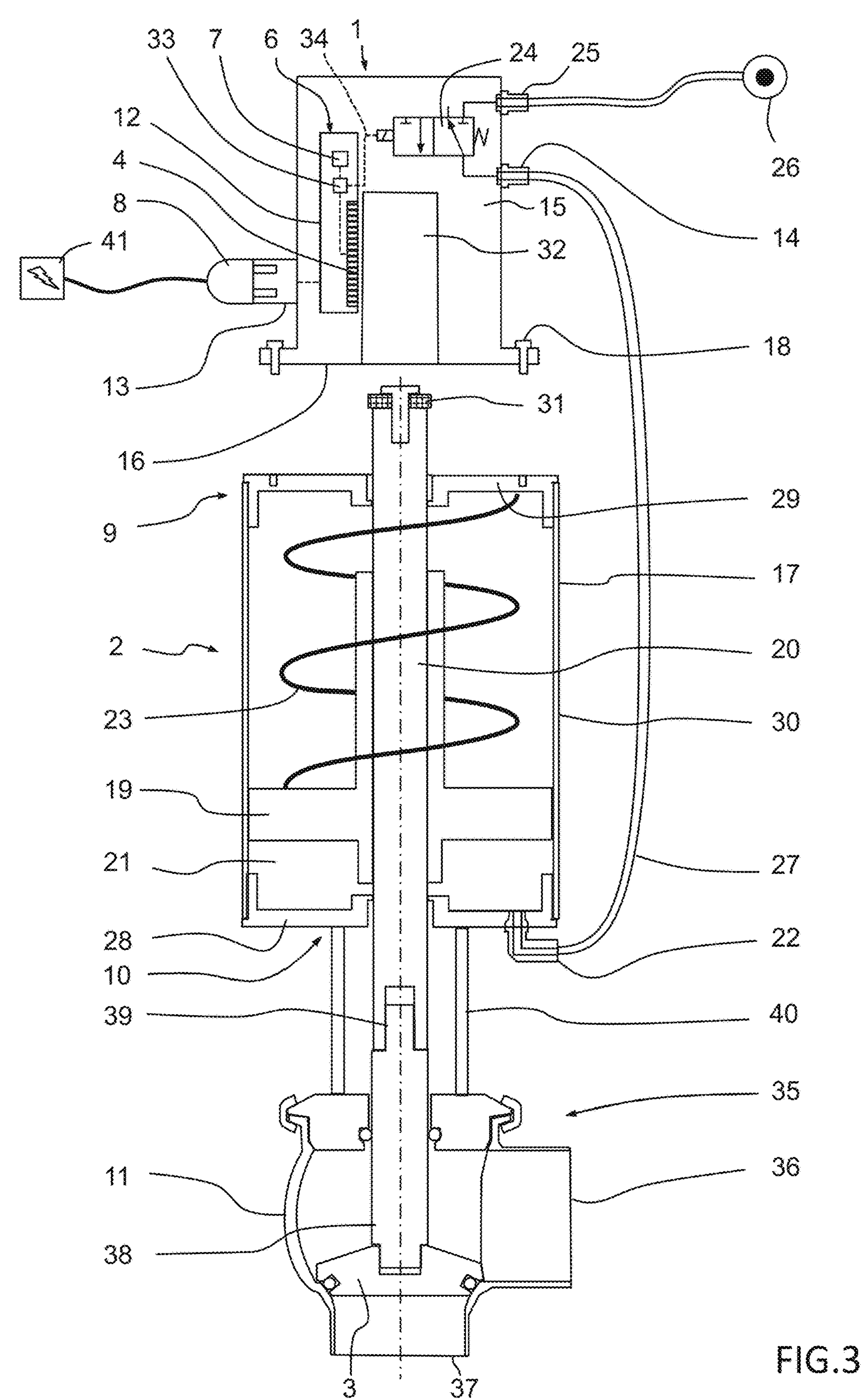
FIG. 3 shows an example embodiment of the assembly having the valve control device separated from the valve actuator.

FIG. 3 shows an example of a separated valve control device 1 from the valve actuator 2. Hence, the user must merely disconnect the fasteners 18 attaching the valve control device 1 to the valve actuator 2 and thereafter remove or lift the valve control device 1 a certain distance, such as for example at least about 10-20 cm or the like. This will cause the position sensor 4 to be out of normal operating range relative to the sensed object 31, and thereby enabling the ECU to automatically detect separation and/or assembly of the valve control device 1 relative to the valve actuator 2.

Specifically, the electronic control unit 6 is configured for performing the automatic detection of said separation and/or assembly of the valve control device 1 relative to the valve actuator 2 based on the feedback signal of the position sensor 4. The feedback signal, i.e. the output signal from the position sensor 4 may have various form, shape and configuration. For example, it may be an electrical analogue signal, such as in the range of 0 to 5 volt [V], or it may be a digital signal. In any event, irrespective of the type of feedback signal, it is generally possibly to determine a separation event of the valve control device 1 based on the feedback signal of the position sensor 4.

Figures 4A, 4B, 4C, 4D:
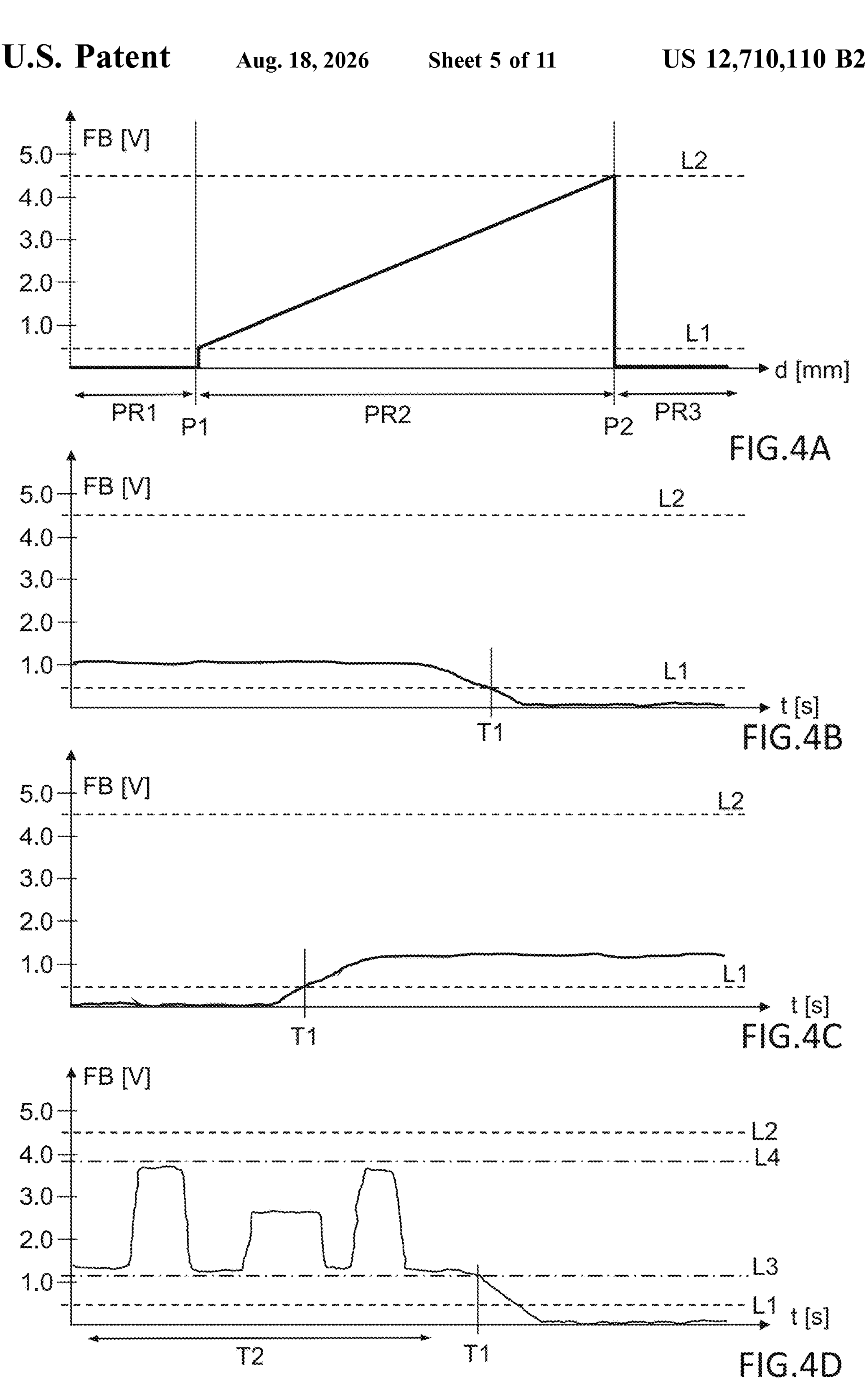
FIG. 4A-d show an example feedback signal from the position sensor.

Merely for schematically illustrating one example sensor output performance graph, i.e. sensor output signal as a function of linear position of a sensed object 31 along a length of a detection area of the position sensor 4, out of many possible alternatives and without limiting the disclosure to exactly this example, reference is made to FIG. 4A.

The graph in FIG. 4A shows a nominal analogue output signal [Volt] of a linear position sensor 4, such as for example a magnetoresistive sensor array, as a function of the position [mm] of a sensed object 31 in form of a magnet, when moving the sensed object 31 over the linear position sensor 4. In position range 1 (PR1), the sensed object 31 is not yet within the measurement region of the position sensor 4, and the output signal, i.e. feedback signal [FB], is therefore 0 volt. At position P1, the sensed object reaches the start of the measurement range of the position sensor 4, i.e. the start of the detection area, and at this point the output signal [FB] increases to 0.5V. Further movement of the sensed object 31 along the length of the detection area results in a linear increase of the output signal until reaching position P2, which represents the end of the measurement range of the position sensor 4, i.e. the end of the detection area, and at this point the output signal is 4.5V. The position range of the sensed objection between position P1 and P2 may be referred to as position range 2 (PR2), which is the maximal measurement range of the position sensor 4. When moving the sensed object still further in the same direction, past position P2, the sensed objection enters position range 3 (PR3), which is located outside the measurable region of the position sensor 4.

In this example embodiment, if the linear position sensor 4 has for example 100 mm measurement range, position P1 may be deemed referring to position 0 mm and position P2 may be deemed referring to position 100 mm.

Lower dotted line L1 in FIG. 4A represents minimal output voltage within the measurement range, i.e. output voltage at position P1, and upper dotted line L2 in FIG. 4A represents maximal output voltage within the measurement range, i.e. output voltage at position P2.

Based on knowledge of the position sensor output signal [FB] as a function of the position [mm] of the sensed object 31, as derived for example from a sensor output performance graph and/or calibration process of the position sensor 4, the ECU may be configured to detect when the feedback signal from the position sensor indicates lack of sensed object, or when the feedback signal from the position sensor indicates valve actuator out of operating range. Any or both these operating statuses, i.e. lack of sensed object, and out of operating range, may be used for determining separated valve control device 1 from valve actuator.

For example, with reference to FIG. 4B, which schematically illustrates the output signal from the position sensor 4, i.e. the feedback signal [FB], over time [seconds], of a position sensor 4 of a valve control device mounted state. Before time point T1, the feedback signal [FB] is higher than the dotted line L1, i.e. higher than a minimal output voltage within the measurement range, and the ECU 6 may thus determine that the valve control device 1 likely is properly mounted on the valve actuator 2. However, at time point T1, the feedback signal falls below the threshold value L1, and the ECU 6 may then determine that the valve control device 1 likely has become separated from the valve actuator 2, and in response thereto, the ECU may be configured to initiate a reset of the position data of the memory device 7.

Similarly, with reference to FIG. 4C, which schematically illustrates the output signal from the position sensor 4, i.e. the feedback signal [FB], over time [seconds], of a position sensor 4 of a valve control device mounted state. Before time point T1, the feedback signal [FB] is lower than the dotted line L1, i.e. lower than a minimal output voltage within the measurement range, and the ECU 6 may determine that the valve control device 1 likely in a separated state from the valve actuator 2. However, at time point T1, the feedback signal increases to value above the threshold value L1, and the ECU 6 may then determine that the valve control device 1 likely has become mounted on the valve actuator 2, and in response thereto, the ECU may be configured to initiate a reset of the position data of the memory device 7.

The ECU may thus be configured to detect removal event of the valve actuator device 1 from the valve actuator 2, removed status of the valve actuator device 1 relative to the valve actuator 2, as well as assembly event of the valve actuator device 1 on the valve actuator 2. All these different feedback signal signatures from the position sensor indicates lack of sensed object.

According to still a further example embodiment, the ECU may be configured to detect when the feedback signal from the position sensor indicates valve actuator being out of operating range, and based on this determining that the valve control device 1 is separated from valve actuator 2 and thus initiates a reset of the position data of the memory device 7.

For example, with reference to FIG. 4D, which schematically illustrates the output signal from the position sensor 4 over time [seconds], of a position sensor 4 of a valve control device 1. The ECU may be configured to determine the upper and lower boundaries of the output signal during normal operation, as illustrated by lower line L3 and upper line L4, respectively, during operating time range T2. The ECU has thus access to information defining that operating range defined by low and upper boundaries L3, L4 represents normal operating range of the valve actuator. The output signal threshold valves representing said lower and upper boundaries L3, L4 may thus be different from the minimal and maximal output voltage within the measurement range L1, L2, as showed in FIG. 4D.

Consequently, when the output signal FB from the position sensor 4 fall below the lower boundary L3 at time point T1 in FIG. 4D, the ECU may determine that the valve control device 1 likely has become separated from the valve actuator 2, and in response thereto, the ECU may be configured to initiate a reset of the position data of the memory device 7.

The output signal of the position sensor 4 showed with reference to FIGS. 4A-4D is merely one example and the disclosure is not limited this example. For example, the output signal may be reversed, i.e. wherein maximal output voltage indicates sensed object out of detection area, etc.

Hence, it is clear that the valve control device according to the invention may be configured to perform automatic reset of the position data of the memory device 7 upon removal, removed or assembly of the valve control device relative to the valve actuator 2.

Consequently, the valve control device may be free from a HMI interface, such as a control button, touch screen, dongle, smart-phone, etc., that otherwise would enable a user to manually activate such as reset, thereby enabling considerable savings on cost and user-friendliness.

For reducing the risk that the ECU initiates automatic reset of the position data of the memory device 7 at undesirable occasions, such as for example during temporarily removal of the valve control device for cleaning purpose of the like, when it can be assumed that the stored position data of the memory device 7 is likely still valid upon subsequent mounting, the electronic control unit 6 may be configured for automatically performing a reset of the memory device 7 as a result of the combined actions of: the valve control device 1 being separated from, and/or assembled on, the valve actuator 2; and the electrical connector being unplugged from the external power supply connector 8 and/or plugged into the external power supply connector 8 while the valve control device 1 is being in a separated state relative to the valve actuator 2.

Figures 5, 6:
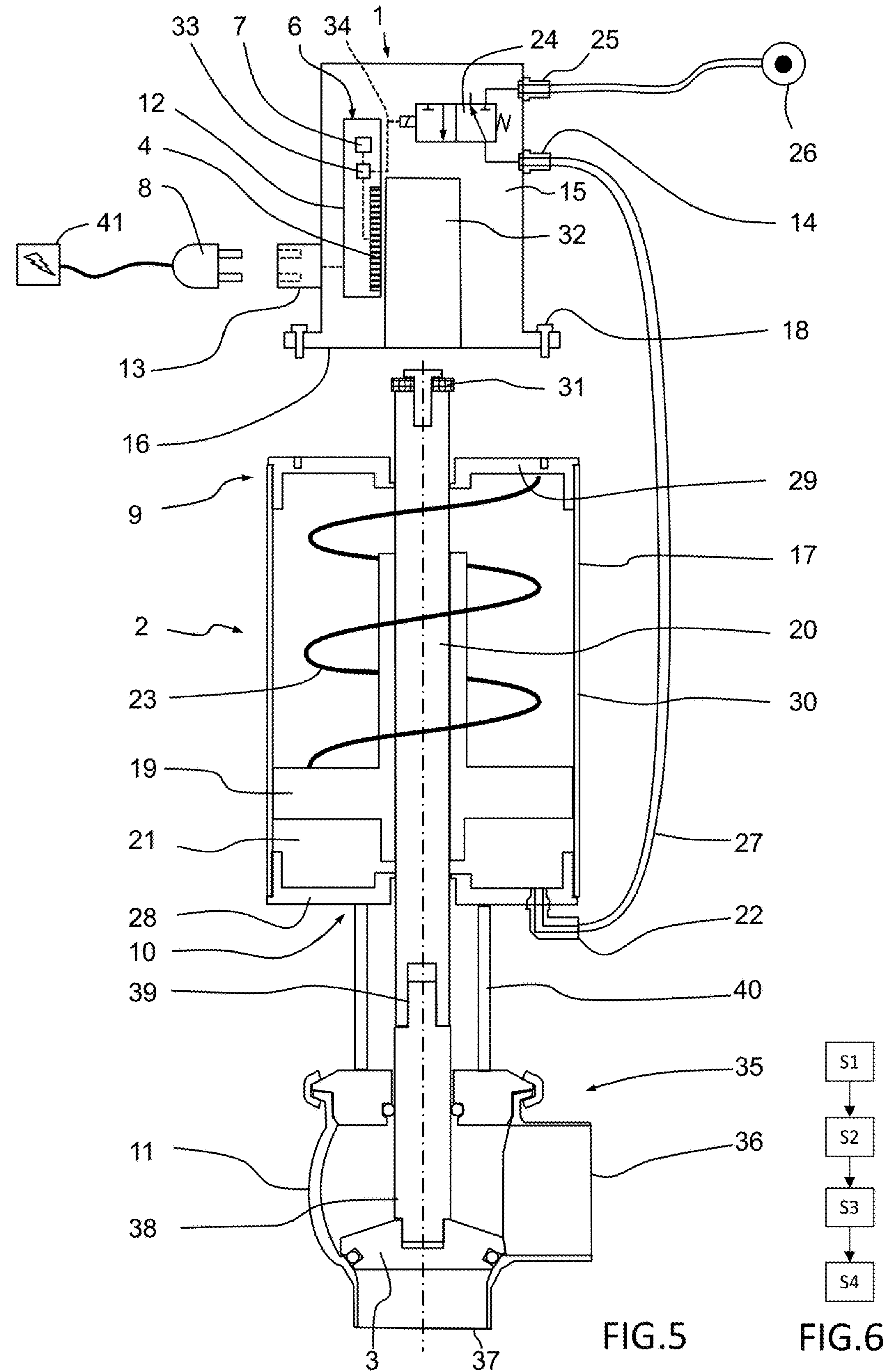
FIG. 5 shows an example embodiment of the assembly having the valve control device separated from the valve actuator and the electrical connector in disconnected state.
FIG. 6 shows some basic steps performed by a user.

Reference is made to FIG. 5 for further describing the concept of having the electrical connector 13 being unplugged from the external power supply connector 8 and/or plugged into the external power supply connector 8 while the valve control device 1 is being in a separated state relative to the valve actuator 2. Specifically, in FIG. 5, the valve control housing 15 is in separated state and the electrical connector 13 is unplugged from the external power supply connector 8.

In other words, the electronic control unit 6 may be configured for automatically performing a reset of the memory device 7 as a result of the combined actions of: the valve control device 1 being separated from the valve actuator 2; and the electrical connector being unplugged from the external power supply connector 8 while the valve control device 1 is being in a separated state relative to the valve actuator 2.

Alternatively, the electronic control unit 6 may be configured for automatically performing a reset of the memory device 7 as a result of the combined actions of: the valve control device 1 being separated from the valve actuator 2; and the electrical connector 13 being plugged into the external power supply connector 8 while the valve control device 1 is being in a separated state relative to the valve actuator 2.

Alternatively, the electronic control unit 6 may be configured for automatically performing a reset of the memory device 7 as a result of the combined actions of: the valve control device 1 being assembled on the valve actuator 2; and the electrical connector being unplugged from the external power supply connector 8 while the valve control device 1 is being in a separated state relative to the valve actuator 2.

Alternatively, the electronic control unit 6 may be configured for automatically performing a reset of the memory device 7 as a result of the combined actions of: the valve control device 1 being assembled on the valve actuator 2; and the electrical connector being plugged into the external power supply connector 8 while the valve control device 1 is being in a separated state relative to the valve actuator 2.

More in detail, in some example embodiments, the electronic control unit 6 is configured for: automatically detecting separation and/or assembly of the valve control device 1 relative to the valve actuator 2; and automatically detecting unplugging or plugging in of the electrical connector relative to the power supply connector 8; and performing a reset of the position data of the memory device in response to the combined actions of automatic detection of separation and/or assembly of the valve control device 1 and automatic detection of unplugging or plugging in of the electrical connector.

The reset of the position data of the memory device may further be dependent on the criteria that said combined actions of automatic detection of separation and/or assembly of the valve control device 1 and automatic detection of unplugging or plugging in of the electrical connector are performed in close time proximity, such as for example within 60 seconds.

Consequently, with reference to FIG. 6, in case a user in a first step S1 separates the valve control device 1 from the valve actuator 2, in a second step S2 unplugs the external power supply connector 8 from the electrical connector 13, in a third step S3 plug in the external power supply connector 8 into the electrical connector 13, and a fourth step S4 assemblies the valve control device 1 on the valve actuator 2, the electronic control unit 6 may be configured for first detecting removal of the valve control device 1 from the valve actuator 2, thereafter detecting unplugging of the electrical connector 13, and finally, upon subsequent plugging in, initiating reset of the of the position data of the memory device 7 in response to said unplugging or plugging in of the external power supply connector 8 from the electrical connector 13 while the position sensor 4 indicated separated valve control device.

Alternatively, with reference again to FIG. 6, in case a user in a first step S1 separates the valve control device 1 from the valve actuator 2, in a second step S2 unplugs the external power supply connector 8 from the electrical connector 13, in a third step S3 assemblies the valve control device 1 on the valve actuator 2, and a fourth step S4 plug in the external power supply connector 8 into the electrical connector 13, the electronic control unit 6 may be configured to first detecting removal of the valve control device 1 from the valve actuator 2, and thereafter detecting unplugging of the electrical connector 13, and upon subsequent plugging in of the external power supply connector 8 into the electrical connector 13, initiating reset of the position data of the memory device 7 in response to said unplugging of the external power supply connector 8 from the electrical connector 13 while the position sensor 4 indicated separated valve control device.

Alternatively, with reference again to FIG. 6, in case a user in a first step S1 unplugs the external power supply connector 8 from the electrical connector 13, in a second step S2 separates the valve control device 1 from the valve actuator 2, in a third step S3 plug in the external power supply connector 8 into the electrical connector 13, and in a fourth step assemblies the valve control device 1 on the valve actuator 2, the electronic control unit 6 may be configured to first detecting plugging in of the electrical connector 13 and detecting removed state of the valve control device 1, and thereafter initiating reset of the position data of the memory device 7 in response to said plugging in of the external power supply connector 8 in the electrical connector 13 while the position sensor 4 indicated separated valve control device 1.

In some example embodiments, the electronic control unit 6 is configured for automatic detection of such separation and/or assembly of valve control device 1 based on the feedback signal of the position sensor. For example, as discussed above with reference to FIGS. 4A-4D, the feedback signal of the position sensor may be indicative of lack of sensor signal, lack of sensed object, signal out of operating range/boundary, signal signature corresponding to separation.

Furthermore, in some example embodiments, the electronic control unit 6 may be configured for automatic detection of unplugging or plugging in of the electrical connector relative to the power supply connector 8 based on measured supply voltage and/or current level. Specifically, the electronic control unit 6 may be configured for storing one or more data values reflecting supply voltage and/or supply current over time, or setting a Boolean variable indicative of a power supply cable unplugging event, or setting a flag indicative of a low/no voltage/current event, such that the electronic control unit 6 upon subsequent powering up in connection with plugging in of the external power supply connector 8 in the electrical connector 13 can determine that an unplugging event, i.e. an electrical power cut or power outage event, has occurred.

Furthermore, electronic control unit 6 may also be configured to store, in a data memory, information indicative of the assembly state of the valve control device 1 at the time point of the electrical power cut event. In other words, the information stored in the data memory is indicative of whether the valve control device 1 was separated from the valve actuator 2 at the time point of the electrical power cut event, or whether the valve control device 1 was mounted on the valve actuator 2 at the time point of the electrical power cut event. This may be accomplished by storing the value of the feedback signal of the position sensor 4 at the time point of the power cut, or by storing an appropriate value of a Boolean variable or flag indicative of for example lack of sensor signal, lack of sensed object, signal out of operating range/boundary, signal signature corresponding to separation.

Consequently, the electronic control unit 6 is configured for being able to, upon subsequent plugging in of the external power supply connector 8 in the electrical connector 13 with the valve control device in a mounted state on the valve actuator 2, determine both that an unplugging event has occurred and the assembly state of the valve control device 1 at the time point of the unplugging event.

In some example embodiments, the electronic control unit 6 is configured for automatically performing a reset of the memory device 7 when the valve control device 1 first has been separated from the valve actuator 2, the power supply connector 8 for powering the valve control device 1 subsequently has been unplugged from the valve control device while the valve control device 1 still is in a separated condition, and the power supply connector 8 for powering the valve control device 1 thereafter has been plugged into the valve control device again.

Furthermore, in some example embodiments, the electronic control unit 6 is configured for automatically performing a reset of the memory device 7 when the power supply connector 8 for powering the valve control device 1 first has been unplugged from the valve control device, the valve control device 1 subsequently becomes separated from the valve actuator 2, and the power supply connector 8 for powering the valve control device 1 thereafter has been plugged into the valve control device again while the valve control device 1 still is in a separated condition.

After the electronic control unit 6 has performed reset of the memory device 7, there is generally a need for making a new setup and/or calibration process of the valve control device 1 for enabling the valve control device 1 to properly perform the monitoring and/or control tasks of the valve actuator 2. Furthermore, this setup or calibration process must clearly be performed when the valve control device 1 is mounted on the valve actuator.

Hence, in some example embodiments, the electronic control unit 6 is configured for, subsequent or in connection with an automatic reset of the memory device of the valve control device 1 and assembly of the valve control device 1 on the valve actuator 2, performing an automatic setup of the valve control device 1, wherein the automatic setup involves storing, in the memory device 7, position data reflecting the feedback signal from the position sensor 4 at at least one actuating position of the valve actuator 2.

More in detail, the automatic setup of the valve control device 1 involves controlling operation of the valve control device 1 to move the valve actuator 2 to its end limit positions, reading the feedback signal of the position sensor 4 at these end limit positions and storing, in the memory device 7, position data in the memory device reflecting the feedback signal at said end limit positions.

The end limit positions of the valve control device may for example be identified by obtaining and storing the values of the output signal from the position sensor 4 at energized and de-energized pneumatic control valve 24, or similar type of action in case of other types of valve actuator 2.

For example, with reference to FIG. 7A, the electronic control unit 6 may be configured for first energizing the pneumatic control valve 24 and thereafter obtaining and storing the value of the feedback signal [FB] of the position sensor 4 at a first end limit position 42 in the memory device 7, and subsequently de-energizing the pneumatic control valve 24 and obtaining and storing the value of the feedback signal of the position sensor 4 at the second end limit position in the memory device 7, or oppositely.

Figures 7A, 7B, 8A, 8B, 8C, 8D:
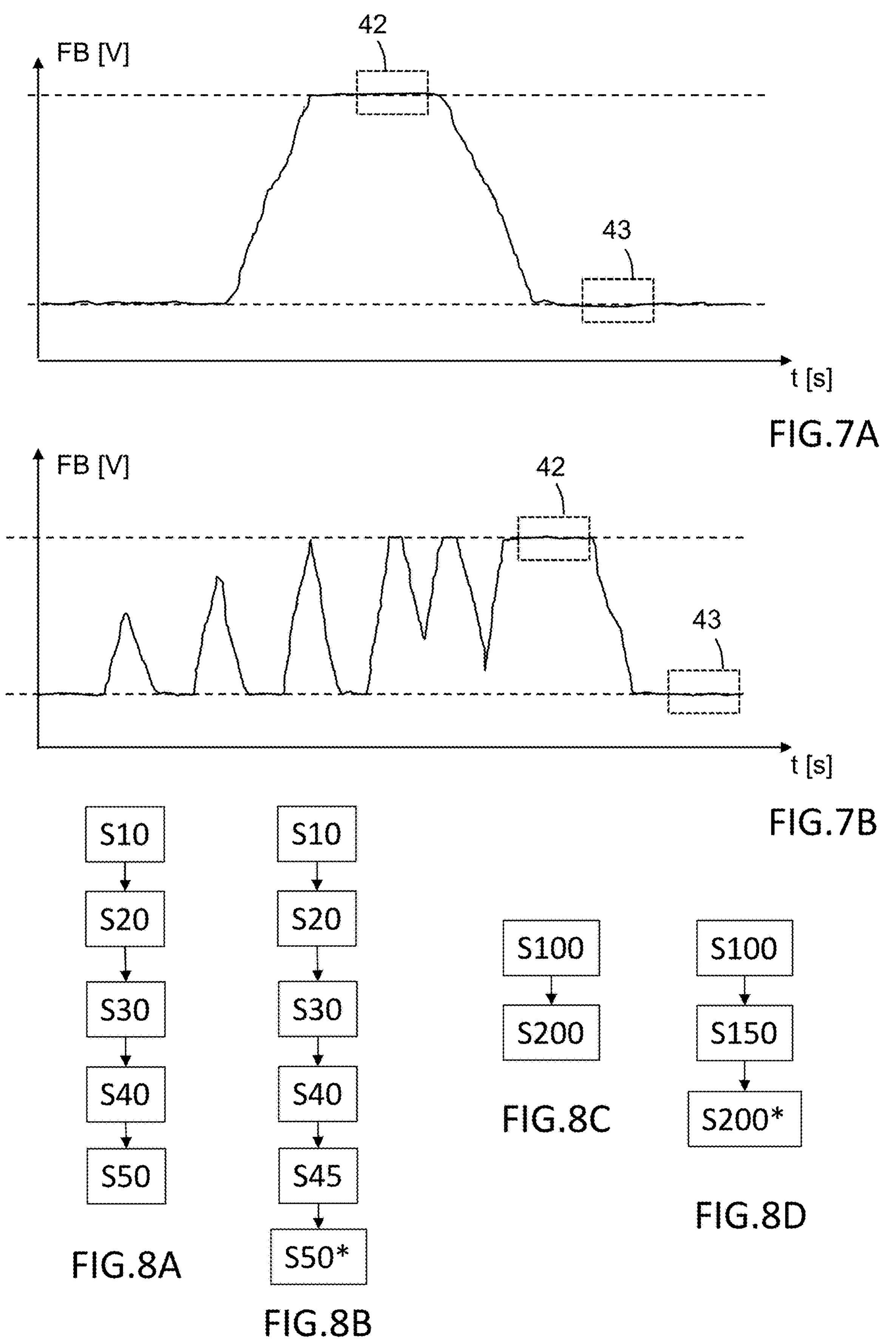
FIG. 7A-B show the feedback signal during setup of the valve control device.
FIG. 8A-D show basic steps of various example methods.

Alternatively, with reference to FIG. 7B, the electronic control unit 6 may be configured for first performing a set of energizing pulses of the pneumatic control valve 24 before initiating the setup and calibration step described above with reference to FIG. 7A. The energizing pulses of the pneumatic control valve 24 may have varying time length and serve the purpose of increasing the likelihood that the valve actuator 2 and associated valve member 3 moves properly before obtaining the values of the output signal from the position sensor 3 at the first and second end limit positions 42, 43.

The disclosure also relates to a method for operating a valve control device 1, which is configured to be removably mounted on a valve actuator 2. The main steps of the method are described below with reference to FIG. 8A. The method comprises a first step S10 of detecting an actuating position of the valve actuator 2 by means of a position sensor 4 of the valve control device 1 and outputting the detected position as a feedback signal.

The method comprises a second step S20 of obtaining the feedback signal from the position sensor 4 by an electronic control unit 6.

The method comprises a third step S30 of controlling operation of the valve actuator 2 by means of the electronic control unit 6 using the received feedback signal from the position sensor 4 and position data obtained from a memory device 7 of the valve control device 1, wherein the memory device 7 stores position data reflecting the feedback signal from the position sensor 4 at at least one actuating position of the valve actuator 2.

The method comprises a fourth step S40 of detecting separation and/or assembly of the valve control device 1 relative to the valve actuator 2, and a fifth step S50 of automatically performing a reset of the position data of the memory device 7 of the valve control device 1 based on a determination that the valve control device 1 has been separated and/or assembled relative to the valve actuator 2.

Specifically, the fourth step S40 of detecting separation and/or assembly of the valve control device 1 relative to the valve actuator 2 may involve comparing the feedback signal of the position sensor with at least one predetermined value or signal indicative of separation and/or assembly of the valve control device 1 relative to the valve actuator 2. For example, the fourth step S40 may involve comparing the feedback signal of the position sensor with a value representing the end of the available measurement range of the position sensor 4.

As described above, in some example embodiment, when it may be desirable to further reducing the risk that the ECU initiates automatic reset of the position data of the memory device 7 at wrong occasions, a modified method may be used, as described below with reference to FIG. 8B. Steps S10-S40 may be the same as those described with reference to FIG. 8A. However, the method may include an intermediate step S45 of detecting unplugging and/or plugging in of an external power supply connector 8 in an electrical connector of the valve control device 1, and detecting whether the valve control device 1 is being in a separated state relative to the valve actuator 2 during said unplugging or plugging in event.

Thereafter, the fifth step S50* comprises automatically performing a reset of the position data of the memory device of the valve control device 1 based on the combined determination that: the valve control device 1 has been separated and/or assembled relative to the valve actuator 2; and the power supply connector 8 for powering the valve control device 1 has been unplugged from the valve control device 1 and/or plugged into the valve control device 1 while the valve control device 1 was in a separated state relative to the valve actuator 2.

The present disclosure also relates to an alternative method for performing a reset of position data of a memory device of a valve control device 1, which is configured to be removably mounted on a valve actuator 2. Specifically, the valve control device 1 comprises: a position sensor 4 for detecting actuating position of the valve actuator 2 and outputting the detected position as a feedback signal; a memory device 7 for storing position data reflecting the feedback signal from the position sensor 4 at at least one actuating position of the valve actuator 2. The electronic control unit 6 may be configured for controlling operation of the valve actuator 2 using the feedback signal from the position sensor 4 and the position data from the memory device 7.

This alternative method comprises, with reference to FIG. 8C, a first step S100 of detecting separation and/or assembly of the valve control device 1 relative to the valve actuator 2, and a second step S200 of automatically performing a reset of the position data of the memory device 7 of the valve control device 1 based on a determination that the valve control device 1 has been separated and/or assembled relative to the valve actuator 2.

As described above, in some example embodiment, when it may be desirable to further reducing the risk that the ECU initiates automatic reset of the position data of the memory device 7 at wrong occasions, a modified method may be used, as described below with reference to FIG. 8D. Step S100 may be the same as described with reference to step S100 in FIG. 8C. However, the method may include an intermediate step S150 of detecting unplugging and/or plugging in of an external power supply connector 8 in an electrical connector of the valve control device 1, and detecting whether the valve control device 1 is being in a separated state relative to the valve actuator 2 during said unplugging or plugging in event.

Thereafter, the method includes a modified second step S200* comprising automatically performing a reset of the position data of the memory device of the valve control device 1 based on the combined determination that: the valve control device 1 has been separated and/or assembled relative to the valve actuator 2; and the power supply connector 8 for powering the valve control device 1 has been unplugged from the valve control device 1 and/or plugged into the valve control device 1 while the valve control device 1 was in a separated state relative to the valve actuator 2.

In some example embodiments, the methods described with reference to FIGS. 8A-8D may further comprise, subsequent or in connection with the step of automatically performing a reset of the position data of the memory device of the valve control device 1 and assembly of the valve control device 1 on the valve actuator 2, a final step of performing an automatic setup of the valve control device 1 after having performed the reset, wherein the automatic setup involves storing, in the memory device 7, position data reflecting the feedback signal from the position sensor 4 at at least one actuating position of the valve actuator 2.

The present disclosure about performing an automatic reset of position data of the memory device 7 is not limited to the valve control device 1, valve actuator 2 and flow control valve 35 described with reference to FIGS. 1A-B and 2A-C. For example, the pneumatic cylinder may be double acting pneumatic cylinder and the flow control valve 35 may be double seat valve, triple seat valve, or any other type of valve.

Figure 9A:
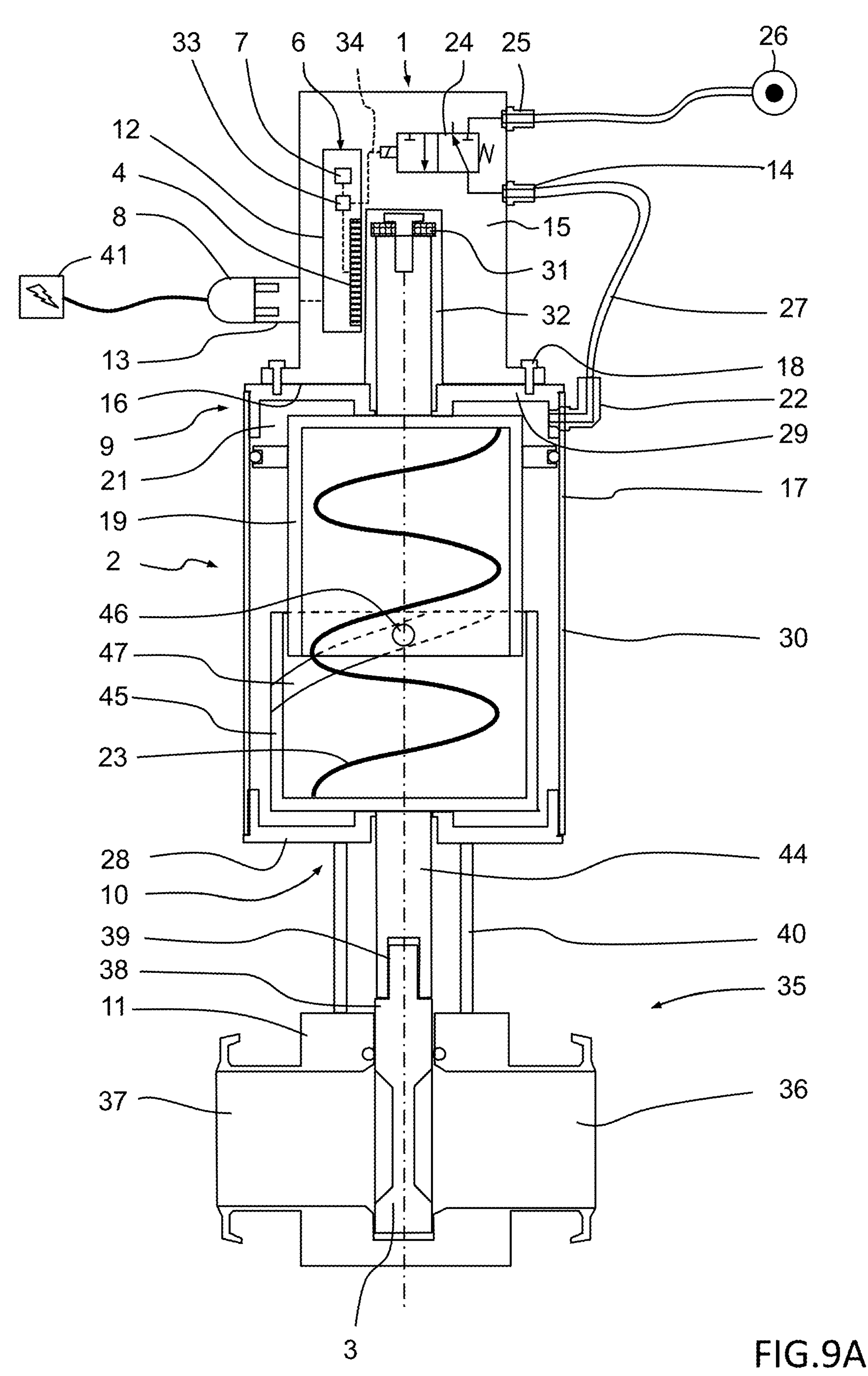
FIG. 9A-B show another example embodiment of the valve control device, valve actuator and flow control valve.
Figure 9B:
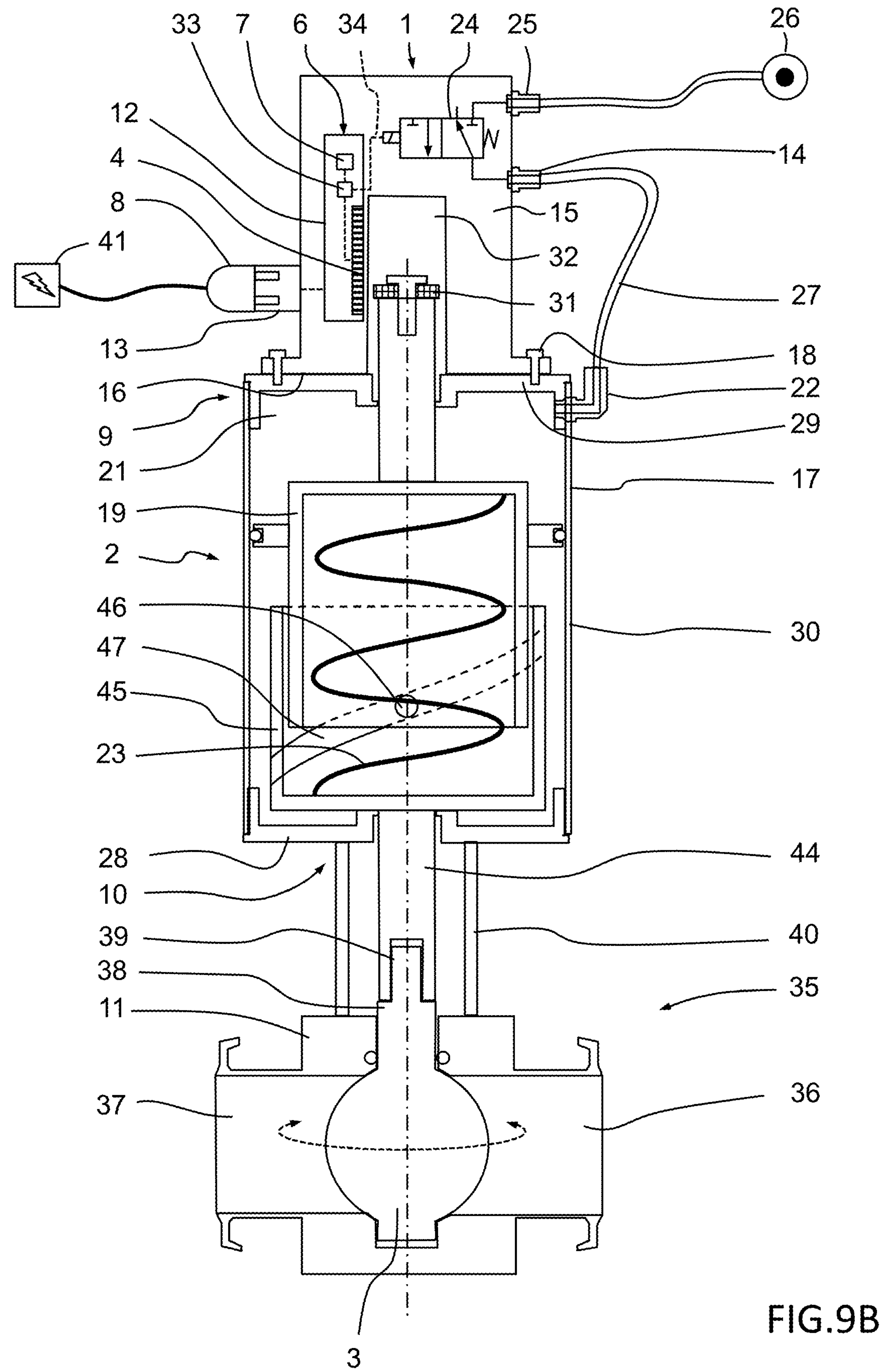

For example, with reference to FIGS. 9A-9B, the valve actuator 2 may include a motion transfer mechanism for transferring a linear motion of a pneumatic piston 19 to a rotational movement of a valve actuating stem 44 of a butterfly-type flow control valve 35. FIG. 9A shows the assembly in closed state and FIG. 9B shows the assembly in open state. Reference is made to the description of FIGS. 1A-1B above for features having the reference signs.

The motion transfer mechanism for transferring a linear motion of a pneumatic piston 19 to a rotational movement of a valve actuating stem 44 may include an axially slidable and rotationally fixed piston 19 powered by pressurised air, an axially secured and rotating sleeve 45 that is rotationally connected with the valve actuating stem 44, and a radially protruding pin 46 of the piston slidable arranged in a helically shaped groove or channel 47 of the sleeve 45. Axial motion of the cylinder with pin will thus induce rotational movement of the sleeve 45.

Figure 10A:
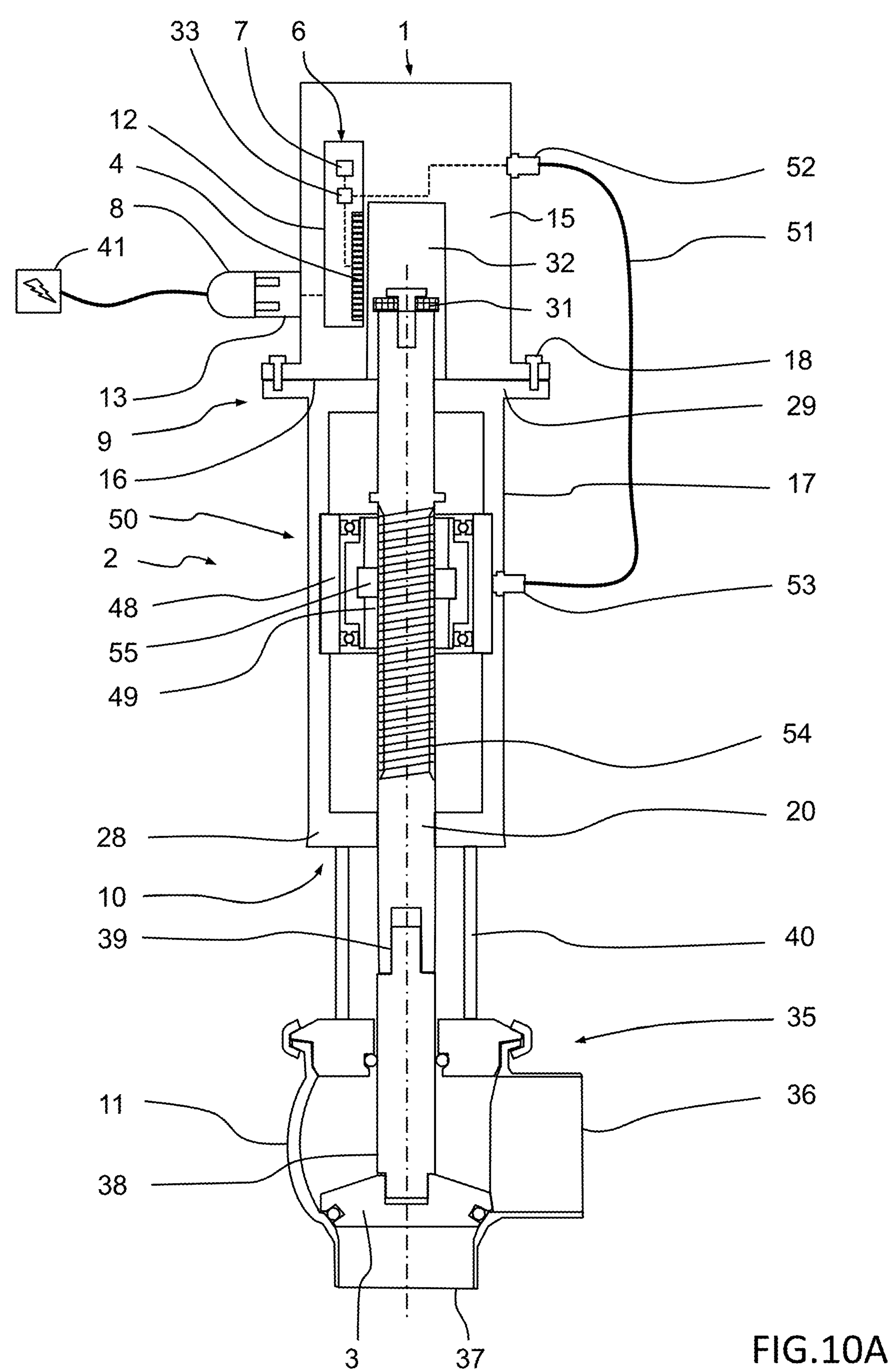
FIG. 10A-B show still another example embodiment of the valve control device, valve actuator and flow control valve.
Figure 10B:
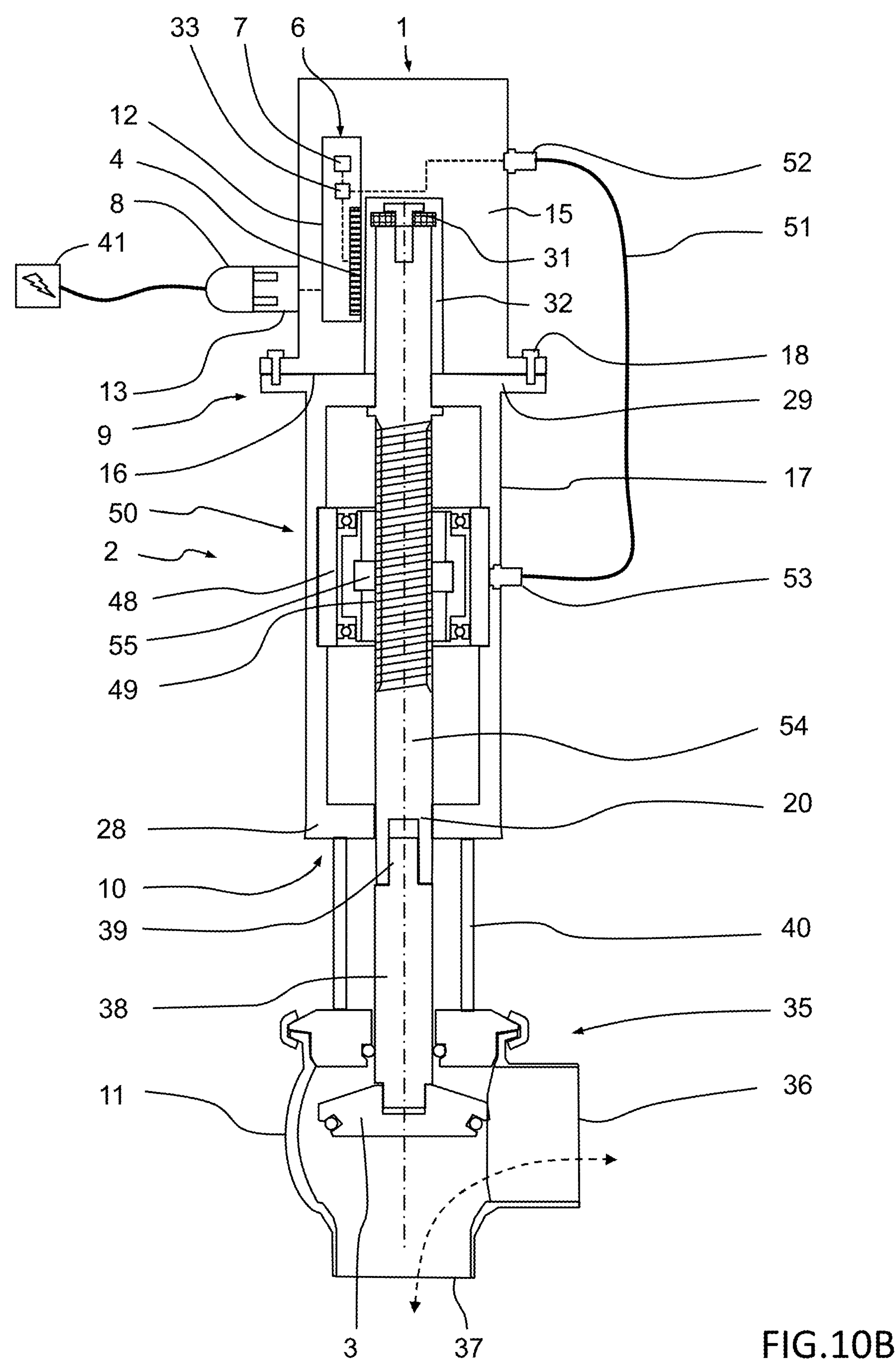

Still more alternatively, with reference to FIGS. 10A-10B, the valve actuator 2 may an electrical linear valve actuator 2 having an axially moveable and rotationally fixed actuating stem 20 that is connected to the valve member 3 of a flow control valve 35. FIG. 10A shows the assembly in closed state and FIG. 10B shows the assembly in open state. Reference is made to the description of FIGS. 1A-1B above for features having the reference signs.

The electrical linear actuator may include an electrical motor 50 having a stationary stator 48 surrounding a rotatable rotor 49, wherein operation of the electrical motor 50 is controlled by the valve control device 1. Specifically, the valve control device 1 may provide an electrical power to the valve actuator 2 via a cable 51 connecting an output connector 52 of the valve control device 1 with an input connector 53 of the valve actuator 2.

Furthermore, the actuating stem 20 may include a threaded area that is in engagement with a correspondingly threaded area 54 of a rotatable nut 55 powered by the rotor 49, wherein operation of the motor 50 will cause the valve member 3 to be displaced between an open and closed position, depending on the direction of rotation of the motor 50.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof.

Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

| REFERENCE SIGNS | |
|---|---|
| 1. | Valve control device |
| 2. | Valve actuator |
| 3. | Valve member |
| 4. | Position sensor |
| 6. | Electronic control unit |
| 7. | Memory device |
| 8. | Power supply connector |
| 9. | First axial side of valve actuator |
| 10. | Second axial side of valve actuator |
| 11. | Valve housing |
| 12. | Printed circuit board |
| 13. | Electrical connector |
| 14. | Output port |
| 15. | Control housing |
| 16. | Connection interface of control housing |
| 17. | Actuator housing |
| 18. | Fasteners |
| 19. | Piston |
| 20. | Actuating stem |
| 21. | Air pressure chamber |
| 22. | Pressure port |
| 23. | Mechanical spring |
| 24. | Pneumatic control valve |
| 25. | Air supply port |
| 26. | Source of pressurized air |
| 27. | Air pipe |
| 28. | Front end cap |
| 29. | Rear end cap |
| 30. | Barrel |
| 31. | Sensed object |
| 32. | Recess |
| 33. | Electronic processor |
| 34. | Electrical connector line |
| 35. | Flow control valve |
| 36. | First flow port |
| 37. | Second flow port |
| 38. | Intermediate stem part |

-continued

| REFERENCE SIGNS | |
|---|---|
| 39. | Stem joint |
| 40. | Spacer |
| 41. | Power grid |
| 42. | First end limit position |
| 43. | Second end limit position |
| 44. | Valve actuating stem |
| 45. | Sleeve |
| 46. | Pin |
| 47. | Channel |
| 48. | Stator |
| 49. | Rotor |
| 50. | Electrical motor |
| 51. | Cable |
| 52. | Output connector |
| 53. | Input connector |
| 54. | Threaded area of stem |
| 55. | Nut |

The invention claimed is:

1. A valve control device for controlling operation of a valve actuator configured to be connected to a valve member, the valve control device being configured to be removably mounted on the valve actuator and comprising:

a position sensor for detecting actuating position of the valve actuator and outputting the detected position as a feedback signal, a memory device for storing position data reflecting the feedback signal from the position sensor at at least one actuating position of the valve actuator, an electronic control unit for controlling operation of the valve actuator using the feedback signal from the position sensor and the position data from the memory device, wherein the electronic control unit is configured for automatically performing a reset of the position data of the memory device as a result of the valve control device becoming separated from, and/or assembled on, the valve actuator, and the electronic control unit being configured for automatic detection of said separation and/or assembly of the valve control device relative to the valve actuator based on the feedback signal of the position sensor.

2. The valve control device according to claim 1, wherein the electronic control unit is configured for automatically detecting separation and/or assembly of the valve control device relative to the valve actuator, and performing a reset of the position data of the memory device in response to such an automatic detection of separation and/or assembly of the valve control device relative to the valve actuator.

3. The valve control device according to claim 1, wherein the electronic control unit further comprises an electrical connector configured for being connected to an external power supply connector, wherein the electronic control unit is configured for automatically performing a reset of the position data of the memory device as a result of the combined actions of:

the valve control device being separated from, and/or assembled on, the valve actuator, and the electrical connector being unplugged from the external power supply connector and/or plugged into the external power supply connector while the valve control device is being in a separated state relative to the valve actuator.

4. The valve control device according to claim 1, wherein the electronic control unit further comprises an electrical connector configured for being connected to an external power supply connector, wherein the electronic control unit is configured for:

automatically detecting separation and/or assembly of the valve control device relative to the valve actuator, and automatically detecting unplugging or plugging in of the electrical connector relative to the power supply connector, and performing a reset of the position data of the memory device in response to the combined actions of automatic detection of separation and/or assembly of the valve control device and automatic detection of unplugging or plugging in of the electrical connector.

5. The valve control device according to claim 1, wherein the electronic control unit further comprises an electrical connector configured for being connected to an external power supply connector, and wherein the electronic control unit is configured for automatically performing a reset of the position data of the memory device when the valve control device first has been separated from the valve actuator, the power supply connector for powering the valve control device subsequently has been unplugged from the valve control device while the valve control device still is in a separated condition, and the power supply connector for powering the valve control device thereafter has been plugged into the valve control device again, or the power supply connector for powering the valve control device first has been unplugged from the valve control device, the valve control device subsequently becomes separated from the valve actuator, and the power supply connector for powering the valve control device thereafter has been plugged into the valve control device again while the valve control device still is in a separated condition.

6. The valve control device according to claim 1, wherein the valve control device is free from a Human Machine Interface that enables a user to activate a reset of the position data of the memory device.

7. The valve control device according to claim 1, wherein the electronic control unit is configured for, subsequent or in connection with an automatic reset of the position data of the memory device of the valve control device and assembly of the valve control device on the valve actuator, performing an automatic setup of the valve control device, wherein the automatic setup involves storing, in the memory device, position data reflecting the feedback signal from the position sensor at at least one actuating position of the valve actuator.

8. The valve control device according to claim 7, wherein the automatic setup of the valve control device involves controlling operation of the valve control device to move the valve actuator to its end limit positions, reading the feedback signal of the position sensor at these end limit positions and storing, in the memory device, position data in the memory device reflecting the feedback signal at said end limit positions.

9. An assembly comprising the valve control device according to claim 1, and the valve actuator, wherein the valve actuator comprises a linearly moveable actuating stem arranged in a stationary actuator housing, and wherein the position sensor is configured for detecting the position of the moveable actuating stem.

10. The assembly according to claim 9, further comprising a valve housing including the valve member, wherein the valve member is connected to the linearly moveable actuating stem of the valve actuator.

11. A method for operating a valve control device, which is configured to be removably mounted on a valve actuator, the method comprising:

detecting an actuating position of the valve actuator by a position sensor of the valve control device and outputting the detected position as a feedback signal, obtaining the feedback signal from the position sensor by an electronic control unit, controlling operation of the valve actuator by the electronic control unit using the received feedback signal from the position sensor and position data obtained from a memory device of the valve control device, wherein the memory device stores position data reflecting the feedback signal from the position sensor at at least one actuating position of the valve actuator, detecting separation and/or assembly of the valve control device relative to the valve actuator, and automatically performing a reset of the position data of the memory device of the valve control device based on a determination that the valve control device has been separated and/or assembled relative to the valve actuator, and subsequent or in connection with the automatically performing of the reset of the position data of the memory device of the valve control device and assembly of the valve control device on the valve actuator, performing an automatic setup of the valve control device, wherein the automatic setup involves storing, in the memory device, position data reflecting the feedback signal from the position sensor at at least one actuating position of the valve actuator.

12. The method according to claim 11, wherein the detecting of the separation and/or assembly of the valve control device relative to the valve actuator involves comparing the feedback signal of the position sensor with at least one predetermined value or signal indicative of separation and/or assembly of the valve control device relative to the valve actuator.

13. The method according to claim 11, further comprising detecting unplugging and/or plugging in of an external power supply connector in an electrical connector of the valve control device, and detecting whether the valve control device is being in a separated state relative to the valve actuator during said unplugging or plugging in event, and automatically performing a reset of the position data of the memory device of the valve control device based on the combined determination that:

the valve control device has been separated and/or assembled relative to the valve actuator, and the power supply connector for powering the valve control device has been unplugged from the valve control device and/or plugged into the valve control device while the valve control device was in a separated state relative to the valve actuator.

14. A valve control device configured to be removably mounted on a valve actuator for controlling operation of the valve actuator, the valve actuator being configured to be connected to a valve member and being movable between end limit positions when the valve control device is initially removably mounted on the valve actuator, the valve control device comprising:

a position sensor that detects actuating position of the valve actuator and that outputs the detected position as a feedback signal, a memory device that stores position data reflecting the feedback signals from the position sensor at multiple actuating positions of the valve actuator inclusive of the end limit positions of the valve actuator, an electronic control unit for controlling operation of the valve actuator using the feedback signal from the position sensor and the position data from the memory device, and the electronic control unit being configured to automatically reset the position data of the memory device, inclusive of the position data reflecting the feedback signals at the end limit positions of the valve actuator, as a result of the valve control device becoming separated from, and/or assembled on, the valve actuator.

15. The valve control device according to claim 14, wherein the electronic control unit is configured to detect that the valve control device is separated from, and/or assembled on, the valve actuator based on the feedback signal of the position sensor.

16. A method for operating a valve control device, which is configured to be removably mounted on a valve actuator that is movable between end limit positions when the valve control device is initially removably mounted on the valve actuator, the method comprising:

detecting actuating positions of the valve actuator, inclusive of the end limit positions, by a position sensor of the valve control device and outputting the detected positions as respective feedback signals, the feedback signals from the position sensor being obtained by an electronic control unit, controlling operation of the valve actuator by the electronic control unit using the received feedback signal from the position sensor and position data obtained from a memory device of the valve control device, wherein the memory device stores position data reflecting the feedback signals from the position sensor at least at the end limit positions of the valve actuator, detecting separation and/or assembly of the valve control device relative to the valve actuator, and automatically performing a reset of the position data that is stored in the memory device and that reflects the feedback signals from the position sensor at the end limit positions of the valve actuator upon detecting the separation and/or assembly of the valve control device relative to the valve actuator.

17. A method for operating a valve control device that is removably mounted on a first valve actuator and that includes a position sensor and a memory device, the method comprising:

operating the first valve actuator to move the first valve actuator to end limit positions that define an operating range of the first valve actuator, the position sensor detecting the end limit positions of the first valve actuator and outputting the detected end limit positions as feedback signals, storing, in the memory device, position data reflecting the feedback signals at the end limit positions of the first valve actuator, and detecting separation of the valve control device relative to the first valve actuator and/or assembly of the valve control device relative to a second valve actuator, and automatically resetting the position data reflecting the feedback signals at the end limit positions of the first valve actuator upon the detecting of the separation of the valve control device relative to the first valve actuator and/or the assembly of the valve control device relative to the second valve actuator.

* * * * *